United States Patent
McIver et al.

(10) Patent No.: US 8,335,742 B2
(45) Date of Patent: Dec. 18, 2012

(54) METHOD, SYSTEM, AND COMPUTER PROGRAM PRODUCT FOR ELECTRONIC MESSAGING

(75) Inventors: Mark McIver, Phoenix, AZ (US);
Richard A. Forbes, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1097 days.

(21) Appl. No.: 11/293,115

(22) Filed: Dec. 5, 2005

(65) Prior Publication Data

US 2006/0224919 A1 Oct. 5, 2006

Related U.S. Application Data

(60) Provisional application No. 60/666,308, filed on Mar. 30, 2005.

(51) Int. Cl.
*G06Q 40/00* (2012.01)
(52) U.S. Cl. ......................................................... 705/39
(58) Field of Classification Search .................. None
See application file for complete search history.

(56) References Cited

U.S. PATENT DOCUMENTS

| | | | | |
|---|---|---|---|---|
| 5,421,008 A | * | 5/1995 | Banning et al. .................. | 1/1 |
| 5,908,467 A | * | 6/1999 | Barrett et al. .................. | 709/218 |
| 6,302,326 B1 | | 10/2001 | Symonds et al. | |
| 6,477,483 B1 | * | 11/2002 | Scarlat et al. .................. | 702/186 |
| 6,816,462 B1 | * | 11/2004 | Booth et al. .................. | 370/248 |
| 7,447,660 B2 | * | 11/2008 | Kubitz ............................ | 705/39 |
| 2005/0021521 A1 | * | 1/2005 | Wycoff .......................... | 707/10 |
| 2005/0091240 A1 | * | 4/2005 | Berkowitz et al. ............. | 707/100 |
| 2007/0186267 A1 | * | 8/2007 | Ohde et al. ..................... | 725/135 |

OTHER PUBLICATIONS

International Inteational Search Report for Appln. No. PCT/US06/11559 mailed Jul. 1, 2008, three (3) pages.
CA; Office Action Feb. 17, 2012 in Application No. 2,602,193.
CN; Office Action Mar. 8, 2012 in Application No. 200680010848.6.
Office Action dated May 16, 2012 in Chinese Office Application No. 200680010848.6.

* cited by examiner

*Primary Examiner* — Olabode Akintola
(74) *Attorney, Agent, or Firm* — Snell & Wilmer L.L.P.

(57) ABSTRACT

A browser-based simulator may be used to create and send test messages to one or more transaction processing facilities (TPFs) to determine the response of the TPF system. It allows a user or plurality of users to create ISO 8583 messages, send the messages to the TPF systems, receive a response, and display the results to the users. Messages created by the simulator are stored within an ANSI queryable SQL database to make test selection simple. The TPF test messages and results are thus available worldwide. Further, the simulator is server-based, so desktop licenses are not required. The simulator allows a user to either select a preformatted message or derive a new message by selecting the data of interest.

23 Claims, 31 Drawing Sheets

TPF TCP/IP Testing Platform— Create New Message

Select Message Type: 1100

| Primary Bitmap Information | Check All | UnCheck All |
|---|---|---|

- ☑ P.A.N. (Field 2)
- ☐ Bill Amount (Field 6)
- ☐ Conv. Rank Card Holder Billing (Field 10)
- ☐ Expiration Date (Field 14)
- ☐ Merchant Type (Field 18)
- ☑ PCS Data Code (Field 22)
- ☑ Accept BUS Code (Field 26)
- ☐ Amounts original (Field 30)
- ☐ PAN extended (Field 34)
- ☐ Approval Code (Field 38)
- ☑ Acpp ID SE (Field42)
- ☐ Amount Fees (Field 46)
- ☐ Currency Code Reconciliation (Field 50)
- ☐ Additional Amounts (Field 54)
- ☐ Authorization Agent Inst. ID (Field 58)
- ☐ GPP Specific (Field 62)

- ☑ Proc Code (Field 3)
- ☐ Date/Time (Field 7)
- ☑ Audit Number (Field 11)
- ☐ Date Settlement (Field 15)
- ☐ County Code Aqu (Field 19)
- ☐ Card Sequence Number (Field 23)
- ☐ Approval Code Length (Field 27)
- ☑ Acquirer Reference Data (Field 31)
- ☐ Track 2 (Field 35)
- ☐ ISO Acquirer ID (Field 39)
- ☐ Acpp Name Loc (Field 43)
- ☐ Additional Data National (Field 47)
- ☐ Currency Code Billing (Field 51)
- ☐ Integrated circuit Card Sys Data (Field 55)
- ☐ Transport Data (Field 59)
- ☐ AAV (Field 63)

- ☑ TXN Amount (Field 4)
- ☐ Amount Fee (Field 8)
- ☑ Transaction Date/Time (Field 12)
- ☐ Date Conversion (Field 16)
- ☐ County Code Primary Account (Field 20)
- ☐ Function Code (Field 24)
- ☐ Date Reconciliation (Field 28)
- ☑ ISO Acquirer ID (Field 32)
- ☐ Track 3 (Field 36)
- ☐ Service Code (Field 40)
- ☐ Additional Response (Field 44)
- ☐ Demographic (Field 48)
- ☐ PIN Data (Field 52)
- ☐ Original Data Elements (Field 56)
- ☐ Reserved National Use I (Field 60)
- ☐ Message Authentication Code (Field 64)

- ☐ REC Amount (Field 5)
- ☐ Conv. Rate (Field 9)
- ☐ Effective Date (Field 13)
- ☐ Date Capture (Field 17)
- ☐ County Code Forwarding Inst. (Field 21)
- ☐ Messenger Reason Code (Field 25)
- ☐ Reconciliation Indicator (Field 29)
- ☐ Forwarding Institution ID (Field 33)
- ☐ Rtrv Ref Num (Field 37)
- ☐ Acpp Trm ID (Field 41)
- ☐ Track 1 (Field 45)
- ☑ Currency Code (Field 49)
- ☐ Secur. Related Catl. Info (Field 53)
- ☐ Authorization life Cycle Code (Field 57)
- ☐ Reserved National Use 2 (Field 61)

Do you have secondary bitmap fields?  ○ Yes  ● No    Next >>

FIG. 7

Tuesday, 17 August 2004 – 12:23pm Good Afternoon Welcome to WWCAS– TCP/IP Testing Platform

WWCAS TCP/IP Simulator Platform

Page 3 of 6

| Test Case Name | View Test Case | Message Folder | Message Type | Update Test Case | Delete Test Case |
|---|---|---|---|---|---|
| TR11.4 | View TR11.4 | Default | 1100 | Update TR11.4 | Delete TR11.4 |
| sample test 305 | View sample test 305 | Default | 1100 | Update sample test 305 | Delete sample test 305 |
| DAYAKARTEST | View DAYAKARTEST | Default | 1100 | Update DAYAKARTEST | Delete DAYAKARTEST |
| TR1.001.1 | View TR1.001.1 | Default | 1100 | Update TR1.001.1 | Delete TR1.001.1 |
| TAB1804V1 | View TAB1804V1 | Default | 1804 | Update TAB1804V1 | Delete TAB1804V1 |
| TR1/001/1GM | View TR1/001/1GM | TR1/001/1GM | 1100 | Update TR1/001/1GM | Delete TR1/001/1GM |
| TESTING | View TESTING | Default | 1100 | Update TESTING | Delete TESTING |
| TR1/003/1 | View TR1/003/1 | TR1/003/AC | 1100 | Update TR1/003/1 | Delete TR1/003/1 |
| TR1/003/3 | View TR1/003/3 | Default | 1100 | Update TR1/003/3 | Delete TR1/003/3 |
| TR1/003/5 | View TR1/003/5 | Default | 1100 | Update TR1/003/5 | Delete TR1/003/5 |

— 1102

[<<Prev] 1 2 3 4 5 6 [Next>>] — 1104

Back to Home — 1106

FIG.11

METHOD, SYSTEM, AND COMPUTER PROGRAM PRODUCT FOR ELECTRONIC MESSAGING

CROSS-REFERENCE TO RELATED APPLICATIONS

This application claims the benefit of U.S. Provisional Application No. 60/666,308, filed Mar. 30, 2005.

BACKGROUND OF THE INVENTION

1. Field of the Invention

The present invention relates to the field of electronic transmission of messages.

2. Background Art

The International Organization for Standardization has adopted a format standard called ISO 8583 for exchanging financial transaction originated messages ("ISO 8583: Financial Transaction Card Originated Messages-Interchange Message Specifications", 2003, incorporated herein by reference in its entirety). ISO 8583 specifies message structure, format, content, data elements, and values for data elements. There are different types of ISO 8583 messages, such as, and without limitation, point-of-sale messages and ATM transaction messages, which vary depending on the purpose of the message.

When a transaction occurs, the related ISO 8583 message is transmitted for processing to a transaction processing facility (TPF), such as that provided by International Business Machines Corporation (IBM) of Armonk, N.Y. When a user, such as a financial transaction card issuing company, is testing, for example and without limitation, connectivity of a system, different types of messages, or new processes, such as a new authorization process within a TPF, a test message must be sent to a TPF. The TPF response will indicate whether the message can be used. The TPF response will also indicate any negative impacts that may affect the transaction card issuer or the cardmember.

In order to test a TPF response to a particular type of message, a programmer has been required to code a driver for each specific message. This is a slow and time consuming process. What is needed is a system and method for sending test messages without requiring individual programming of each message.

BRIEF SUMMARY OF THE INVENTION

A browser-based TCP/IP simulator may be used to create and send test messages to one or more TPFs to determine the response of the TPF system. It allows a user or plurality of users to create ISO 8583 messages, send the messages to the TPF systems, receive a response from the TPF systems, and display the results to the users. The simulator may also have the ability to send MQseries messages to the TPF and/or any other MQ-supported operating system.

Messages created by the simulator are stored within an ANSI (American National Standards Institute) queryable structured query language ("SQL") database to make test selection simple. As the SQL database may be accessed from any location, the TPF test messages and results are available worldwide.

Further, the simulator may be server-based. If the simulator is server-based, desktop licenses are not required. The simulator allows a user to either select a preformatted message or derive a new message by selecting the data of interest.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7 illustrates another example message creation screen generated by the graphical user interface.

FIG. 11 illustrates an example message table generated by the graphical user interface.

The present invention will be described with reference to the accompanying drawings. The drawing in which an element first appears is typically indicated by the leftmost digit(s) in the corresponding reference number.

DETAILED DESCRIPTION OF THE INVENTION

Figure 1:
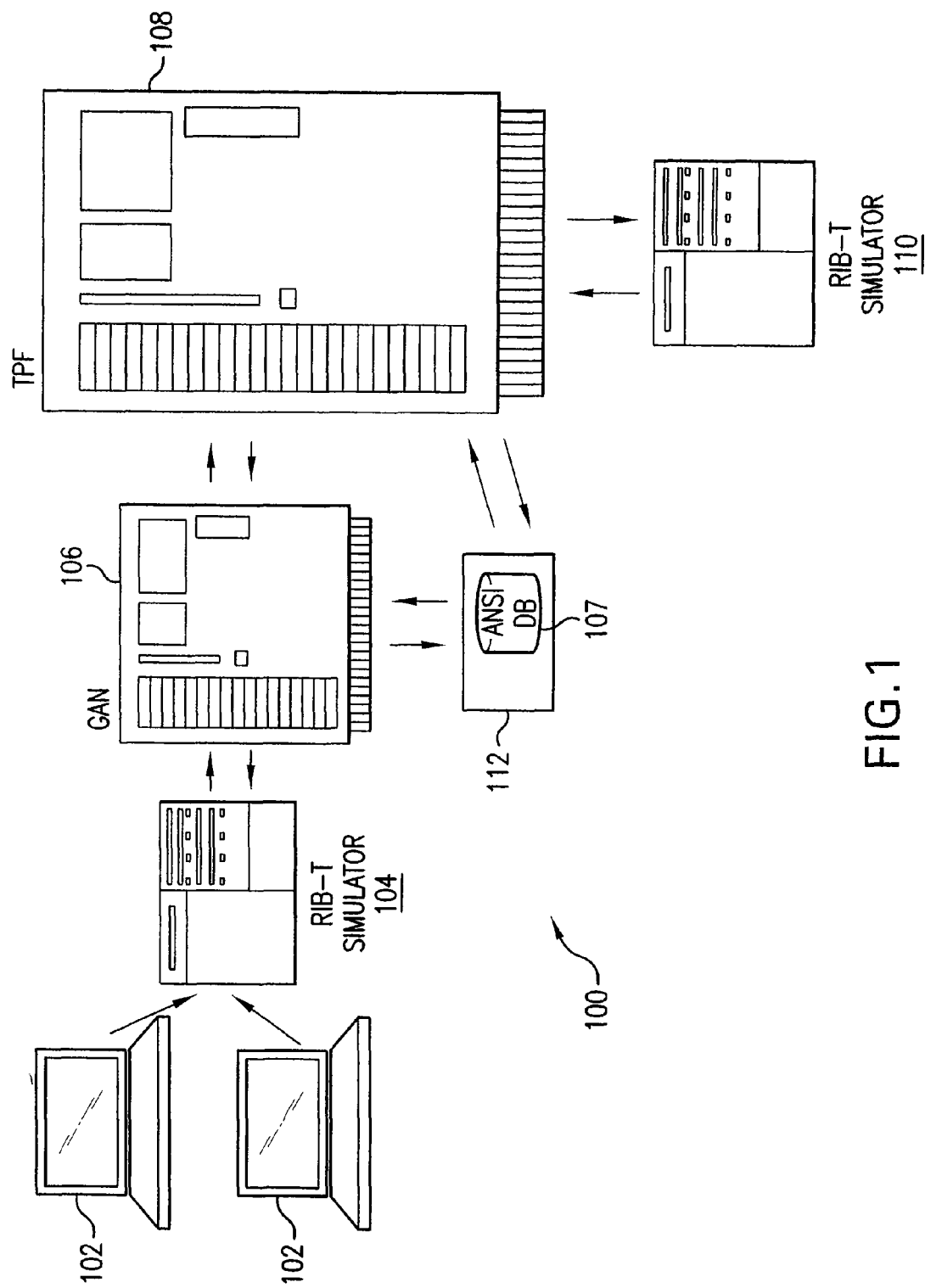
FIG. 1 is a block diagram of an example messaging test system.

The terms "user", "end user", "consumer", "customer", participant", and/or the plural form of these terms are used interchangeably throughout herein to refer to those persons or entities capable of accessing, using, being affected by, and/or benefiting from the tool described herein.

Furthermore, the terms "business" or "merchant" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an online merchant, or the like.

Persons skilled in the relevant art(s) will understand the breadth of the terms used herein and that the exemplary descriptions provided are not intended to be limiting of the generally understood meanings attributed to the foregoing terms.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications. Although the invention will be described herein as using the ISO 8583 message format, one of skill in the art will recognize that other message formats may also be used.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Current message test software requires a user to code a driver for each specific message sent to a transaction processing facility ("TPF"). Additionally, message test software is currently client-based, in that the system must be installed on an end user's local device for operation by each end user. This presents several disadvantages, such as requiring a license fee on a per-seat basis. All messages and responses are likewise stored in the local device. This inhibits sharing of messages and responses between end users, such as end users working together on a specified project at separate locations.

Many of the messages tested by users are similar in type and/or format. To prevent users from having to re-code similar messages, and in order to accommodate various message types that may be requested by users, a variety of ISO 8583 message shells may be stored in an ANSI (American National Standards Institute) queryable structured query language ("SQL") database on a centralized server. These message shells may have been previously coded to include information corresponding to desired message types. A browser-based TCP/IP simulator (hereinafter referred to simply as the simulator) can be used by multiple users to access the database. As the SQL database may be accessed from any location, the TPF test messages and responses are available worldwide. Additionally, since the simulator is server-based, desktop licenses are not required.

FIG. 1 is a block diagram of an example system 100 in which a message simulator may be used for communicating with a TPF 108. Users can connect to simulator 104 using, for example, user interfaces 102. A user interface 102 may be, for example, a personal computer, workstation, or point of sale ("POS") terminal. Simulator 104 may connect to TPF 108 through a network, such as global area network 106. Alternatively, the simulator may connect directly to TPF 108, as shown by the connection between simulator 110 and TPF 108. User interface 102 may be located at any point in global area network ("GAN") 106, and may be used at any point in the end-to-end process. Simulator 104 may be used to test the response of TPF 108 to any type of financial transaction message, such as point-of-sale messages or ATM transaction messages. Communication between simulator 104 and TPF 108 may occur using, for example and without limitation, message queue software such as MQSeries software from IBM.

Messages sent from simulator 104 to TPF 108 may be stored in ANSI queryable database 107. ANSI queryable database 107 may be implemented in a database server 112, which may be separate from TPF 108 and GAN 106. Responses received from TPF 108 may also be stored in ANSI queryable database 107. ANSI queryable database 107 may also store the message shells used by the user through simulator 104 in creating test messages.

Figure 2:
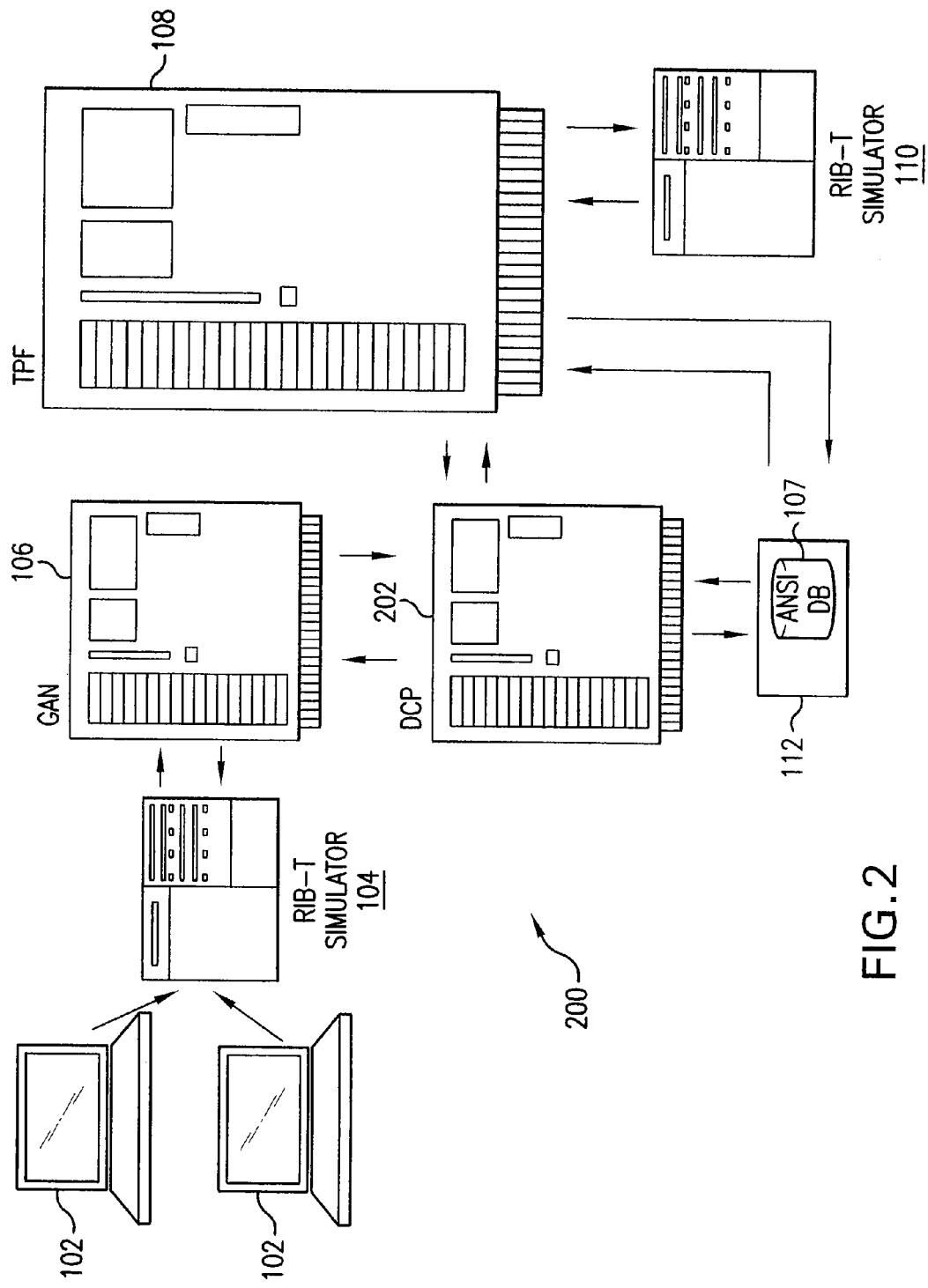
FIG. 2 is a block diagram of another example messaging test system.

FIG. 2 is a block diagram of another example system 200 for communicating with TPF 108. As shown in FIG. 2, a data control protocol (DCP) device 202 may optionally be used to communicate between network 106 and TPF 108.

Figure 3:
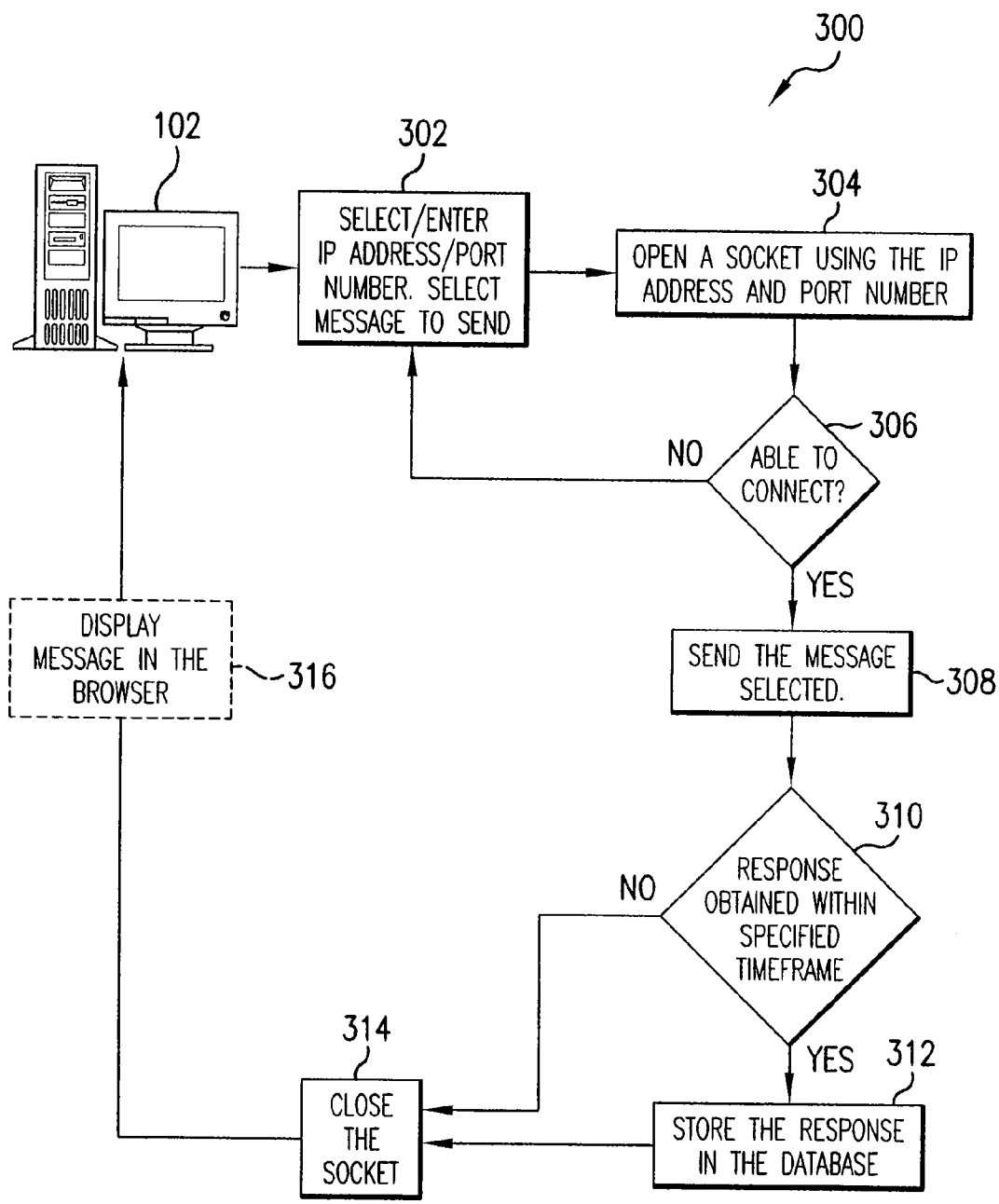
FIG. 3 is a flowchart of an example method for testing a TPF response to a single message.

FIG. 3 is a flowchart of a method 300 for testing a TPF system's response to a single test message.

In step 302, the IP address and port number for a TPF, such as TPF 108, is selected or entered into a simulator, such as simulator 104, which is accessed at user interface 102. The message is then requested to be sent.

In step 304, a socket is opened between the simulator and the TPF using the TPF IP address and port number.

In step 306, it is determined whether a connection has been made to the TPF. If a connection is made, method 300 proceeds to step 308. If no connection is made, method 300 returns to step 302, where the same or a new IP address and port number may be selected or entered.

In step 308, the test message is sent to the TPF and stored in the ANSI queryable database.

In step 310, it is determined whether a response to the sent message is obtained from the TPF within a specified timeframe. If a response is timely obtained by simulator 104, method 300 proceeds to step 312. If a response is not timely obtained, method 300 proceeds to step 314.

In step 312, the received TPF response to the sent test message is stored. A test message sent as a single message, as opposed to a batch of messages, is often a critical message whose response will undergo significant analysis. The single message response may thus be stored in message format in, for example, ANSI queryable database 107 for ease of access and analysis by a user. Alternatively, the message response may be output to a text file.

In step 314, the socket is closed.

In an optional step 316, the message and/or any received response is displayed by the simulator on user interface 102, such as, for example, in the browser of user interface 102.

Figure 4:
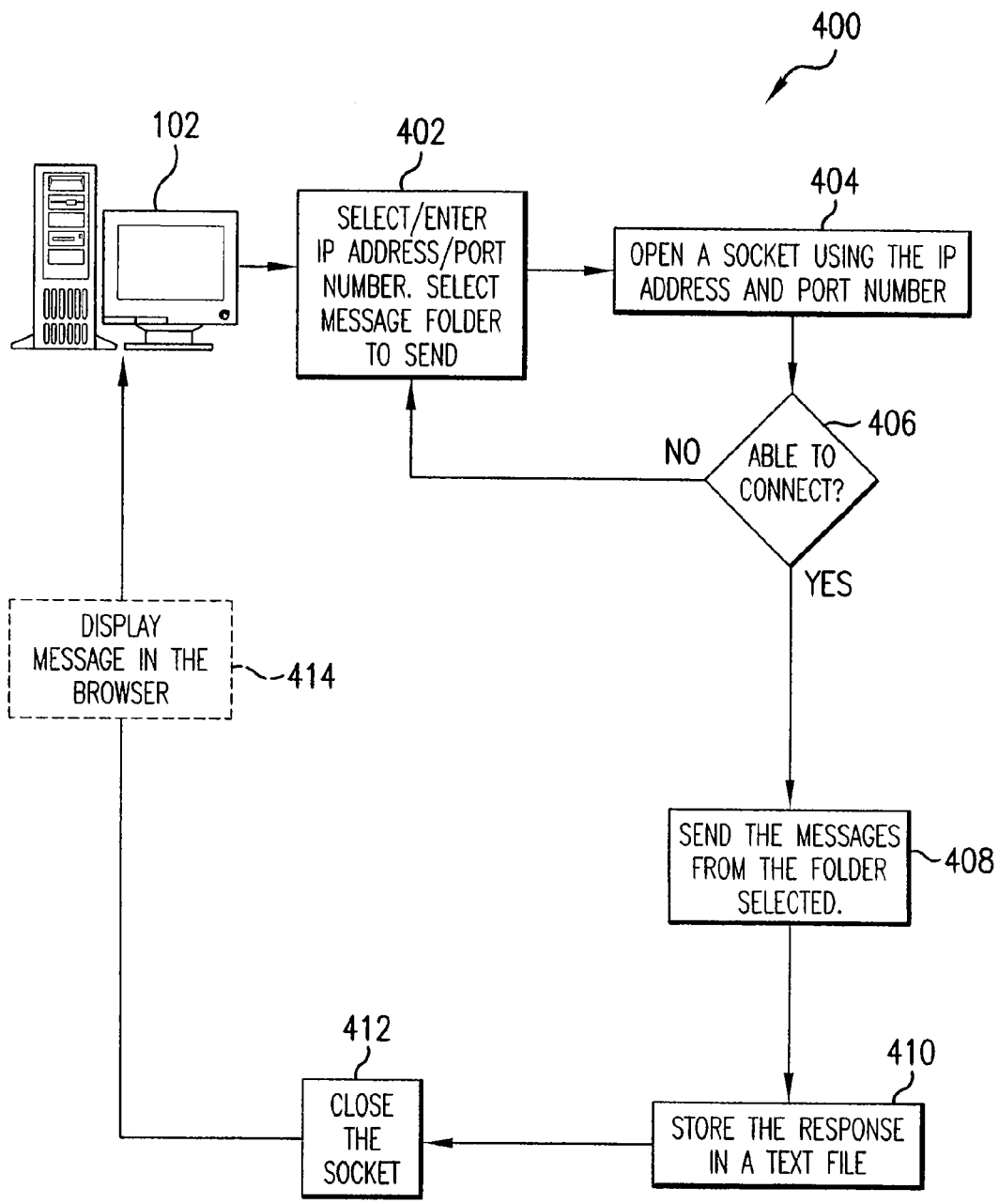
FIG. 4 is a flowchart of an example method for testing a TPF response to a volume of messages.

FIG. 4 is a flowchart of a method 400 for testing a TPF system's response to a volume of messages.

In step 402, the IP address and port number for a TPF, such as TPF 108, is selected or entered into a simulator, such as simulator 104, which is accessed at user interface 102. Multiple messages are then requested to be sent by, for example, selecting the messages from a list or selecting a folder containing the messages.

In step 404, a socket is opened between the simulator and the TPF using the IP address and port number of the TPF.

In step 406, it is determined whether a connection has been made to the TPF. If a connection is made, method 400 proceeds to step 408. If no connection is made, method 400 proceeds to step 402, where a new IP address and port number may be selected.

In step 408, the selected messages are sent. When multiple messages are being sent, the number of transactions per second may be predetermined or may be set by, for example, a user.

In step 410, any received response is stored. The response may be stored in a file, such as a text file, or a database, such as ANSI queryable database 107. Storing to a text file is useful when a plurality of responses is expected, as when a plurality of messages was initially sent, so that the responses do not overload the database. The text file can be audited at a later time, if necessary. The text file may be stored, for example, external to database 107 on server 112.

In step 412, the socket is closed.

In an optional step 414, the sent messages and/or any received response is displayed by the simulator on the user interface 102, such as, for example, in the browser of user interface 102.

An example embodiment of a browser-based TCP/IP simulator, such as simulator 104, for creating and testing TPF response to messages will now be described with reference to FIGS. 5-31. One of skill in the pertinent art will recognize that other simulator formats may be used without departing from the spirit and scope of the present invention.

Figure 5:
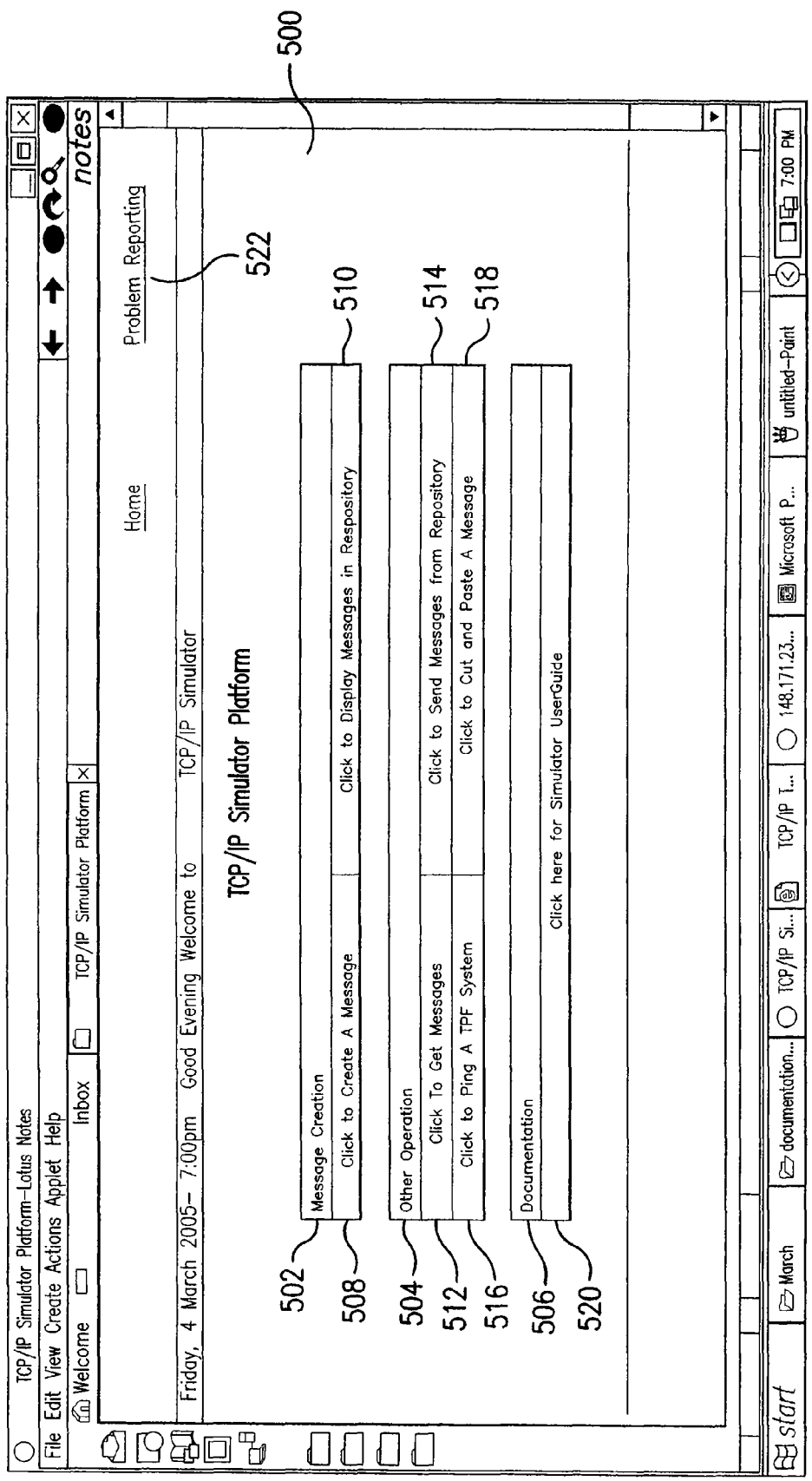
FIG. 5 illustrates an example graphical user interface homepage of a simulator according to an embodiment of the present invention.

FIG. 5 depicts an example graphical user interface homepage 500 for simulator 104. Homepage 500 may be displayed, for example, by logging into a server running simulator 104. Homepage 500 includes a message creation menu 502, an operations menu 504, and a documentation menu 506. The term "link" as used herein will be recognized by one of skill in the relevant art(s) as referring to any link, hyperlink, button, or other selector that directs the user to additional information. Similarly, references to any radio button, check box, text box, drop box, or other selector that allows for data entry by a user will be recognized by one of skill in the relevant art(s) to be interchangeable with each other as used herein.

Message creation menu 502 includes a message creation link 508 and a messages in repository display link 510. Operations menu 504 includes a get messages link 512, a send messages from repository link 14, a TPF system ping link 516, and a message cut-and-paste link 518. Documentation menu 506 includes a simulator user guide link 520. The functions of each of these links will be described below.

Figure 6:
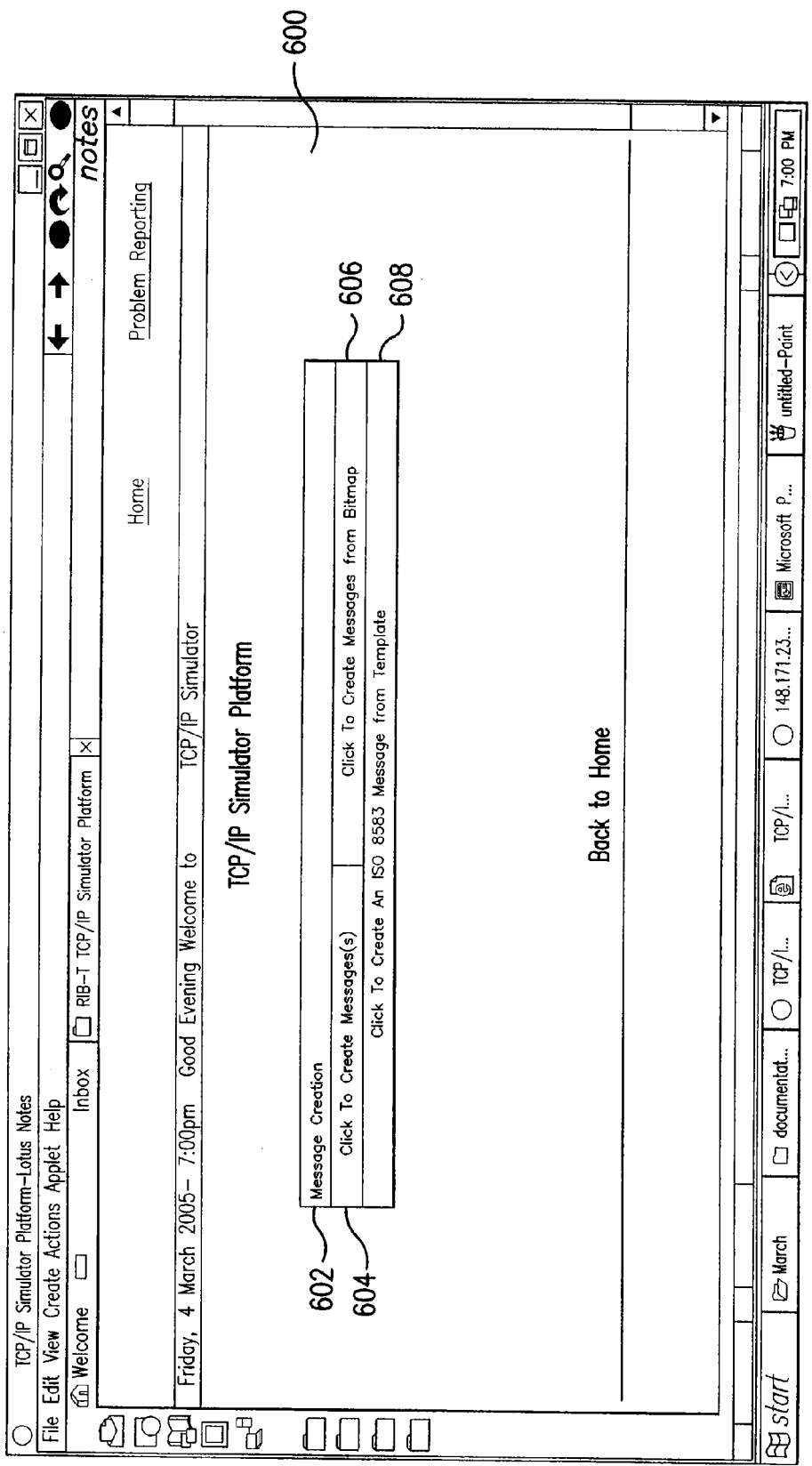
FIG. 6 illustrates an example message creation screen generated by the graphical user interface.

FIG. 6 depicts a message creation screen 600, that is displayed when message creation link 508 is selected. Message creation screen 600 includes a second message creation menu 602. Second message creation menu 602 includes a standard message creation link 604, a message creation from bitmap link 606, and a message creation from template link 608.

FIG. 7 depicts a new message creation screen 700 that is displayed when standard message creation link 604 is selected. New message creation screen 700 includes a select message type menu 702 for selecting or entering a message type. The message type options may be predetermined, or may be entered by, for example, a user. Once a message type is determined, new message creation screen 700 displays a table 704 of fields, or primary bitmap information, that can be included in the message. A bitmap of an ISO 8583 message is the first portion of the message data stream. A bitmap may be 8, 16, or 32 characters. In FIG. 7, an example message type "1100" is selected in message type menu 702. One or more boxes next to the available fields may be checked to indicate inclusion in the message. Each message type may include a variety of fields. For example, an ISO 8583 point-of-arrival ("POA") message can include 128 fields. Different message types may include the same or similar fields.

Figure 8:
FIG. 8 illustrates an example secondary message field table generated by the graphical user interface.

New message creation screen 700 also includes a secondary bitmap selection box 706. If no secondary fields are to be specified, the "no" radio button may be selected. The "next" button may then be selected to continue. As shown in FIG. 8, if the "yes" radio button is selected, a secondary field table 802 is displayed in new message creation screen 700. Secondary field table 802 includes a list of secondary bitmap information that may be included for the specified message type. Once the appropriate fields are selected, the "next" button (not shown) may be selected to advance to the next screen.

Figure 9:
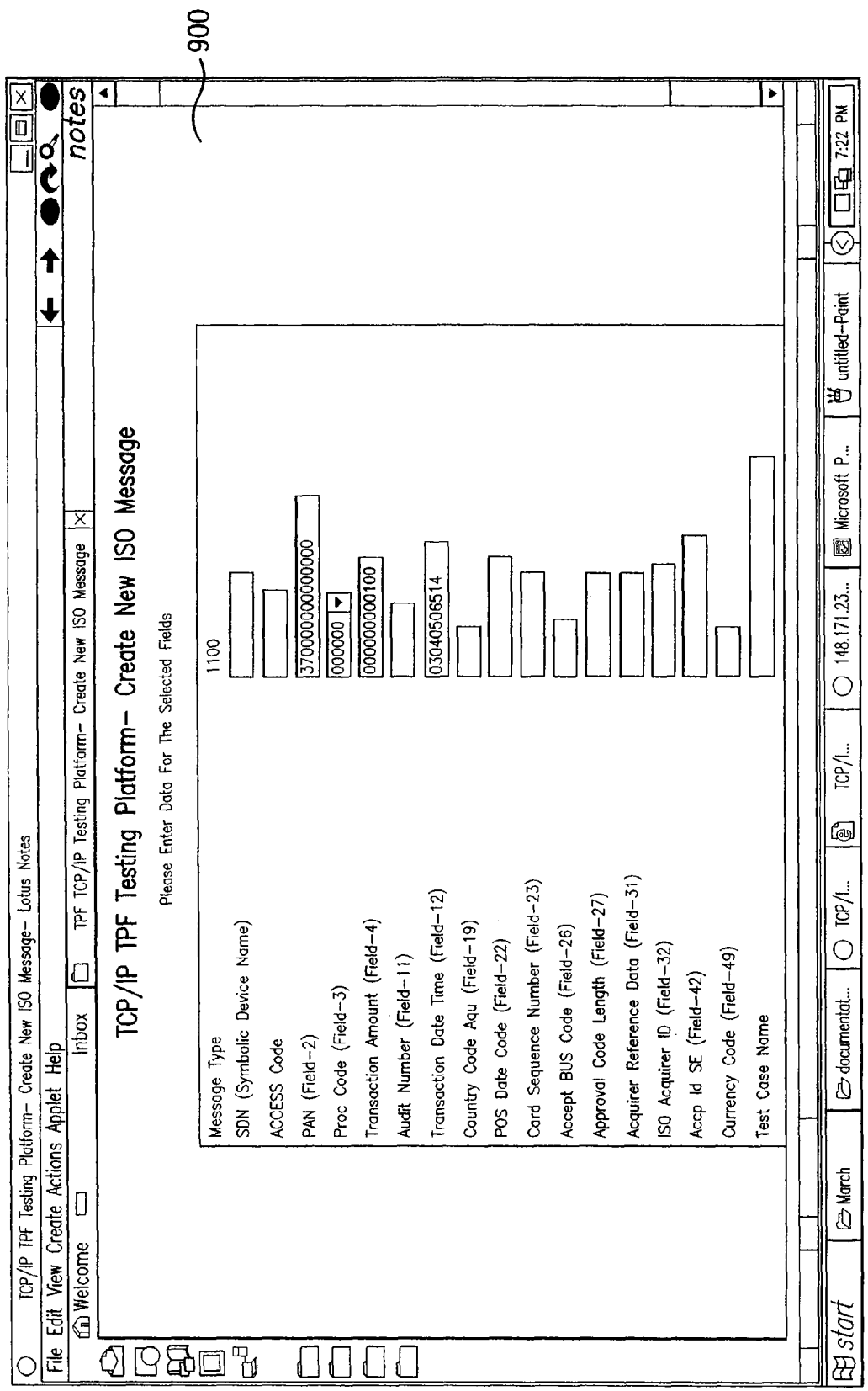
FIG. 9 illustrates an example data entry screen generated by the graphical user interface.

The simulator then displays a data entry screen 900, as shown in FIG. 9. The fields selected in new message creation screen 700 are displayed with text boxes for entering the requested data. Certain data may be pre-entered based on information from new message creation screen 700. Such data may be editable or uneditable. Once the required data has been entered, an ISO message save button (not shown) can be selected to save the message.

Figure 10:
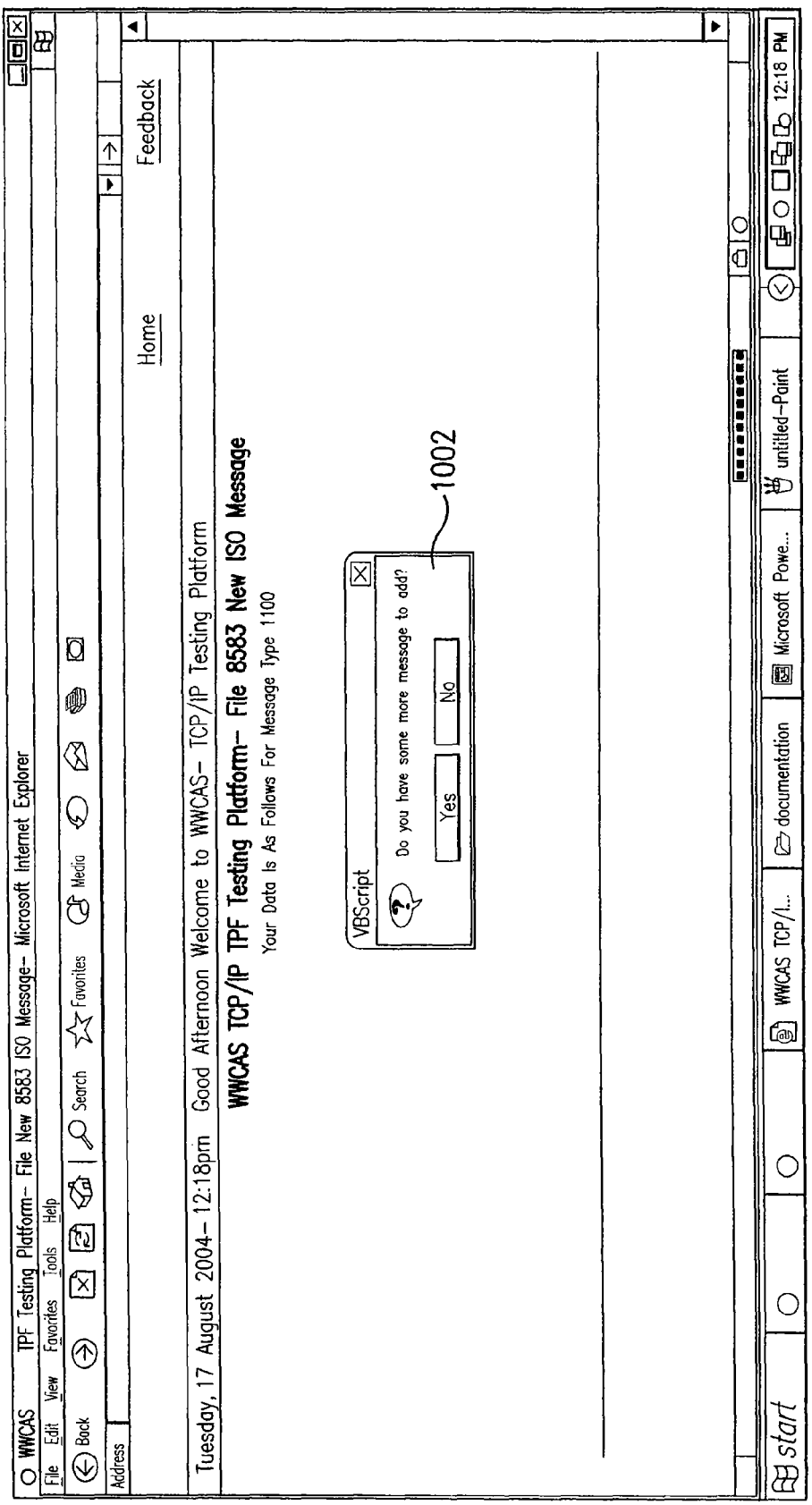
FIG. 10 illustrates an example additional message menu generated by the graphical user interface.

After the message is saved, the simulator displays additional message menu 1002, as shown in FIG. 10. Additional message menu 1002 contains text asking whether more messages will be added. If more messages are to be added, the "yes" button may be selected. If no more messages are to be added, the "no" button may be selected. If the "yes" button is selected, new message creation screen 700 is displayed again and the screen sequence is repeated.

If the "no" button is selected, a message table 1102 listing created messages is displayed, as shown in FIG. 11. For each message, message table 1102 may include, for example and without limitation, the name of the test message, a hyperlink to a detailed view of the message, the folder where the message is stored, the message type, a link for updating the test message, and a link for deleting the test message. To navigate through pages containing the messages, a message navigation menu 1104 may be used. To return to homepage 500, a back to home link 1106 may be selected.

Figure 12:
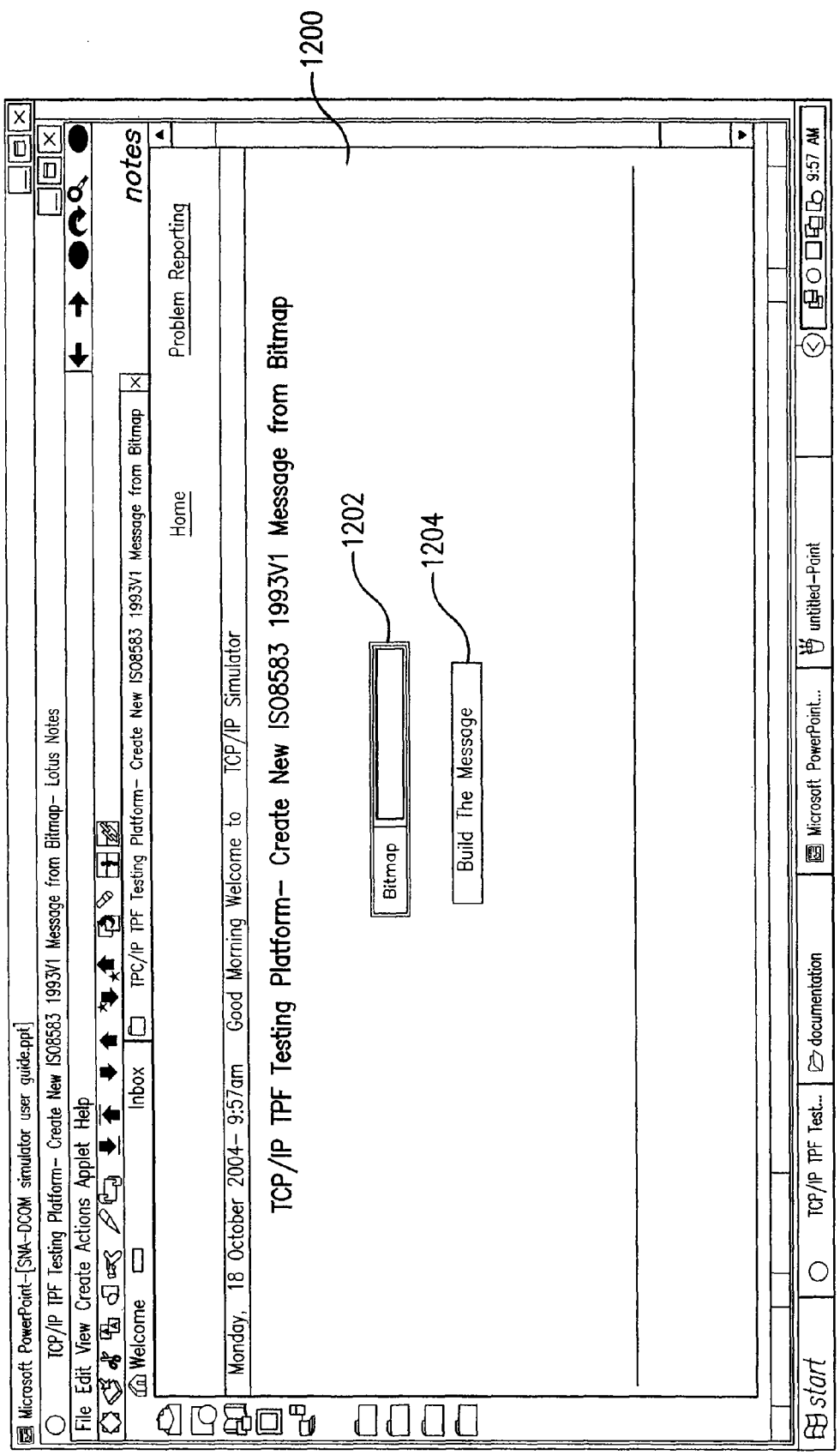
FIG. 12 illustrates an example bitmap selection screen generated by the graphical user interface.

FIG. 12 depicts a bitmap selection screen 1200 that is displayed when message creation from bitmap link 606 (as shown in FIG. 6) is selected. The bitmap is the first portion of the ISO 8583 message. Each data element in the message is assigned a position indicator in the bitmap. A bitmap identifier, such as the first 8 characters, may be entered to identify a desired message bitmap. Once a bitmap identifier is entered into bitmap text box 1202, a message building button 1204 may be selected.

Figure 13:
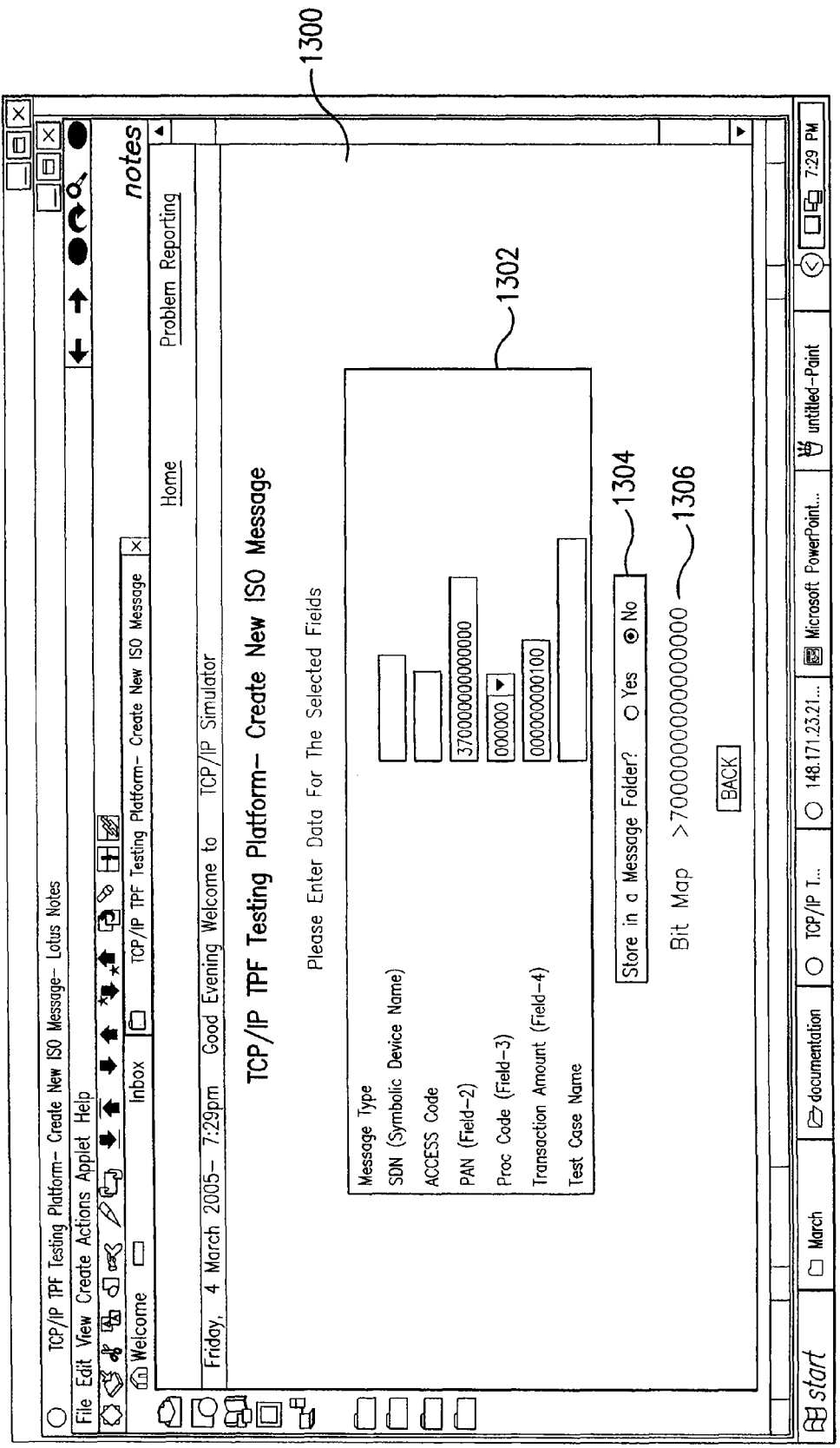
FIG. 13 illustrates an example data entry screen generated by the graphical user interface.

FIG. 13 depicts a data entry screen 1300 that is displayed when message building button 1204 is selected. Data entry screen 1300 includes a selected field data entry menu 1302. Selected field data entry menu 1302 includes text boxes for entering data corresponding to the selected fields. The available fields may be automatically determined based on the bitmap requested. The data may be pre-entered based on previously received information, or may be entered by, for example, a user. Once the message data is entered, the message may be stored in a message folder. The appropriate radio button can be selected from message folder storage menu 1304. Data entry screen 1300 may also display a bitmap identifier, such as bitmap identifier 1306, which indicates the bitmap from which the message is being created.

After the message has been saved, the simulator process and display is similar to that described with respect to FIGS. 10 and 11.

Figure 14:
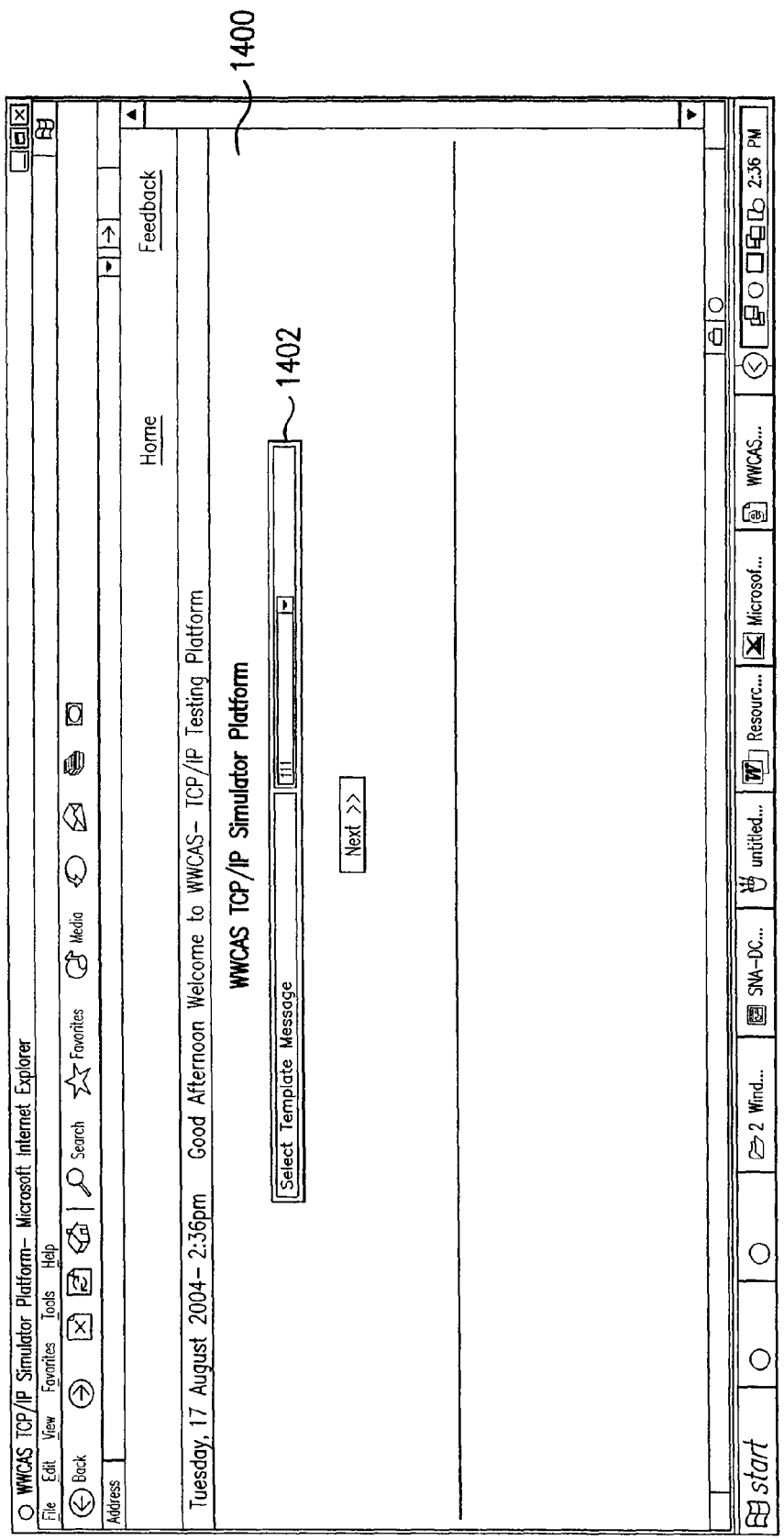
FIG. 14 illustrates an example message from template screen generated by the graphical user interface.

FIG. 14 depicts a message from template screen 1400 that is displayed when message creation from template link 608 (as shown in FIG. 6) is selected. Message from template screen 1400 includes a template menu 1402, where a particular message template can be selected or entered. Once the message template has been determined, a "next" button may be selected to proceed to the next screen. The simulator process and display is then similar to that described with respect to FIGS. 7 through 11.

Figure 15:
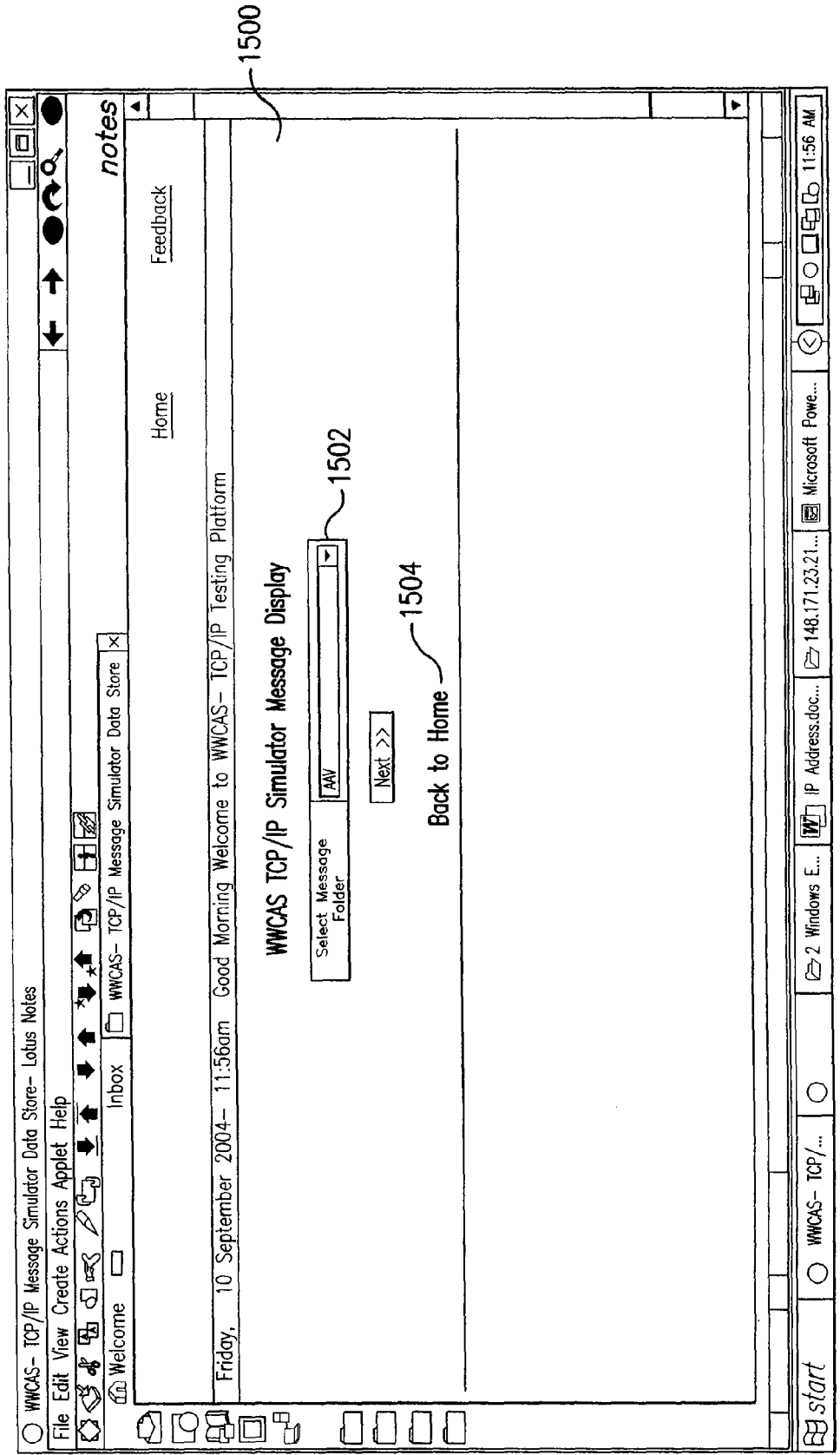
FIG. 15 illustrates an example message folder select screen generated by the graphical user interface.

From homepage 500, all the messages in a particular folder may be displayed by selecting messages in repository display link 510. Message folder select screen 1500 is then displayed, as shown in FIG. 15. Message folder select screen 1500 includes a message folder select menu 1502. Message folder select menu 1502 includes names of folders having messages stored therein. The name of the folder from which messages are to be displayed is selected from message folder select menu 1502. If a user wishes to continue displaying messages in the selected message folder, the "next" button may be selected. If the user wishes to return to homepage 500, the back to home link 1504 may be selected.

Figure 16:
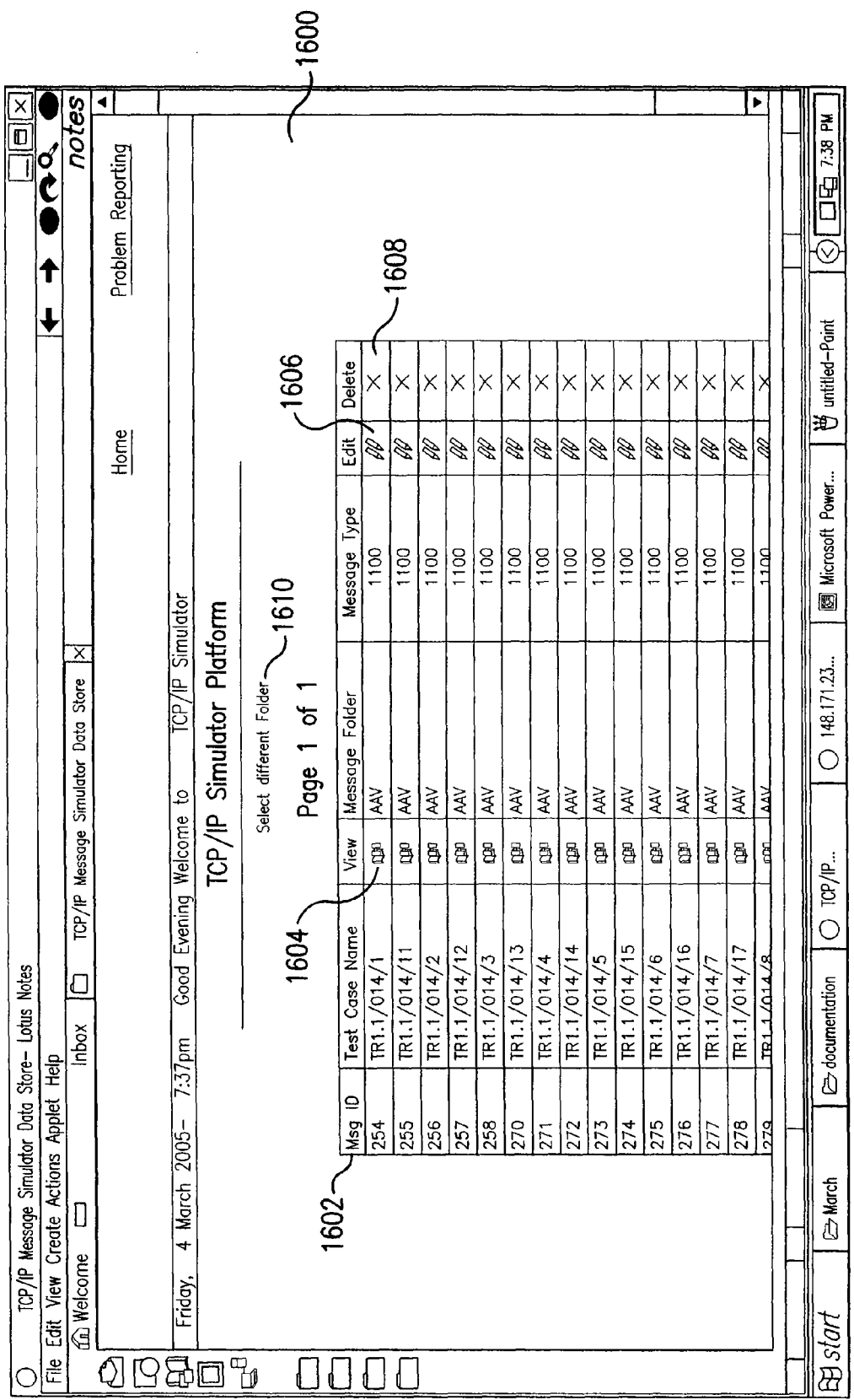
FIG. 16 illustrates an example message list screen generated by the graphical user interface.

Once the appropriate folder has been chosen from message folder select menu 1502 and the "next" button has been selected, a message list screen 1600 is displayed, as shown in FIG. 16. Message list screen 1600 includes a message table 1602 that displays the messages contained in the selected message folder. Listed for each message in the selected folder may be, for example and without limitation, a message identifier, the name of the related test case, the name of the folder in which the message is stored, and the message type. To view a particular message, a message view icon, such as icon 1604, may be selected. To edit a particular message, a message edit icon, such as icon 1606, may be selected. To delete a particular message, a message delete icon, such as icon 1608, may be selected. Selecting a select different folder link 1610 returns the user to message folder select screen 1500.

Figure 17:
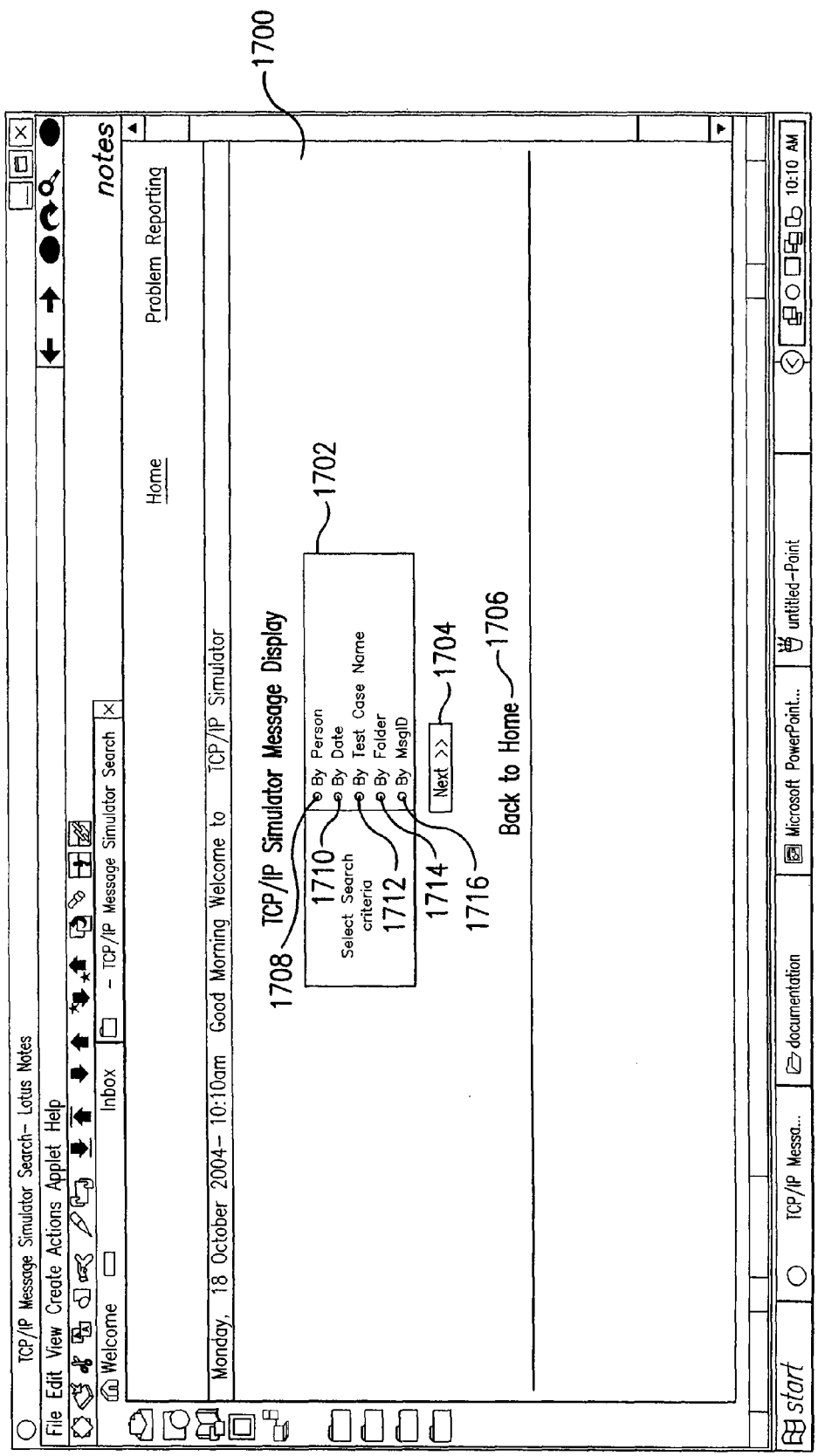
FIG. 17 illustrates an example message filter screen generated by the graphical user interface.

To filter messages in a particular folder, get messages link 512 may be selected. This displays message filter screen 1700, as shown in FIG. 17. Message filter screen 1700 includes a search criteria menu 1702 in which criteria for filtering the messages may be selected. Search criteria menu 1702 may allow a user to search, for example, by person, by date, by test case name, by folder, and/or by message identifier. One of skill in the art will recognize that other search criteria may be used to filter the messages without departing from the spirit and scope of the present invention. To view messages according to a particular criterion, the radio button next to the criteria is selected. Optionally, multiple criteria may be selected at one time. Once the appropriate radio button is selected, next button 1704 may be selected. Alternatively, back to home button 1706 may be selected.

Figure 18:
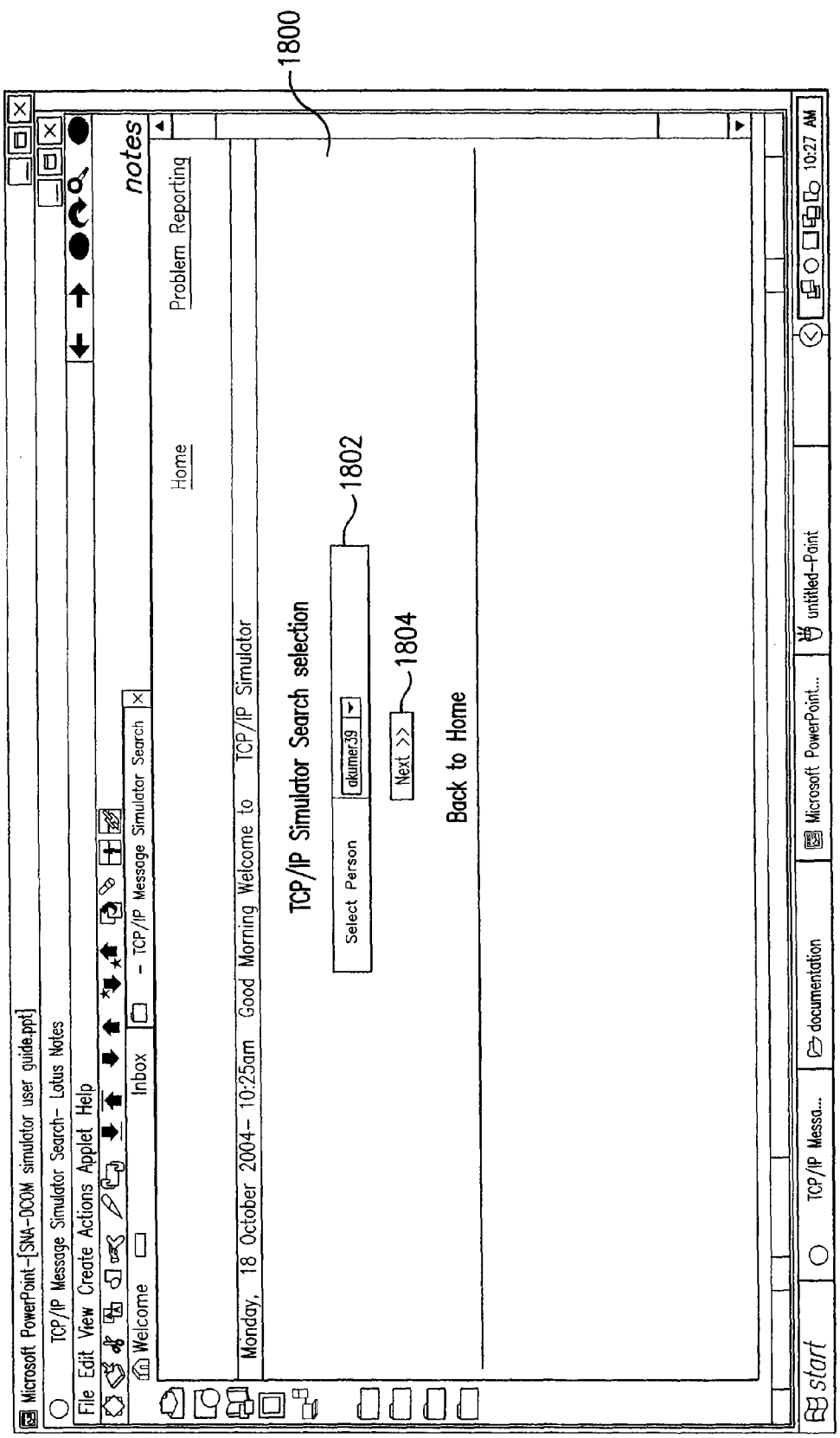
FIG. 18 illustrates an example person selection screen generated by the graphical user interface.
Figure 19:
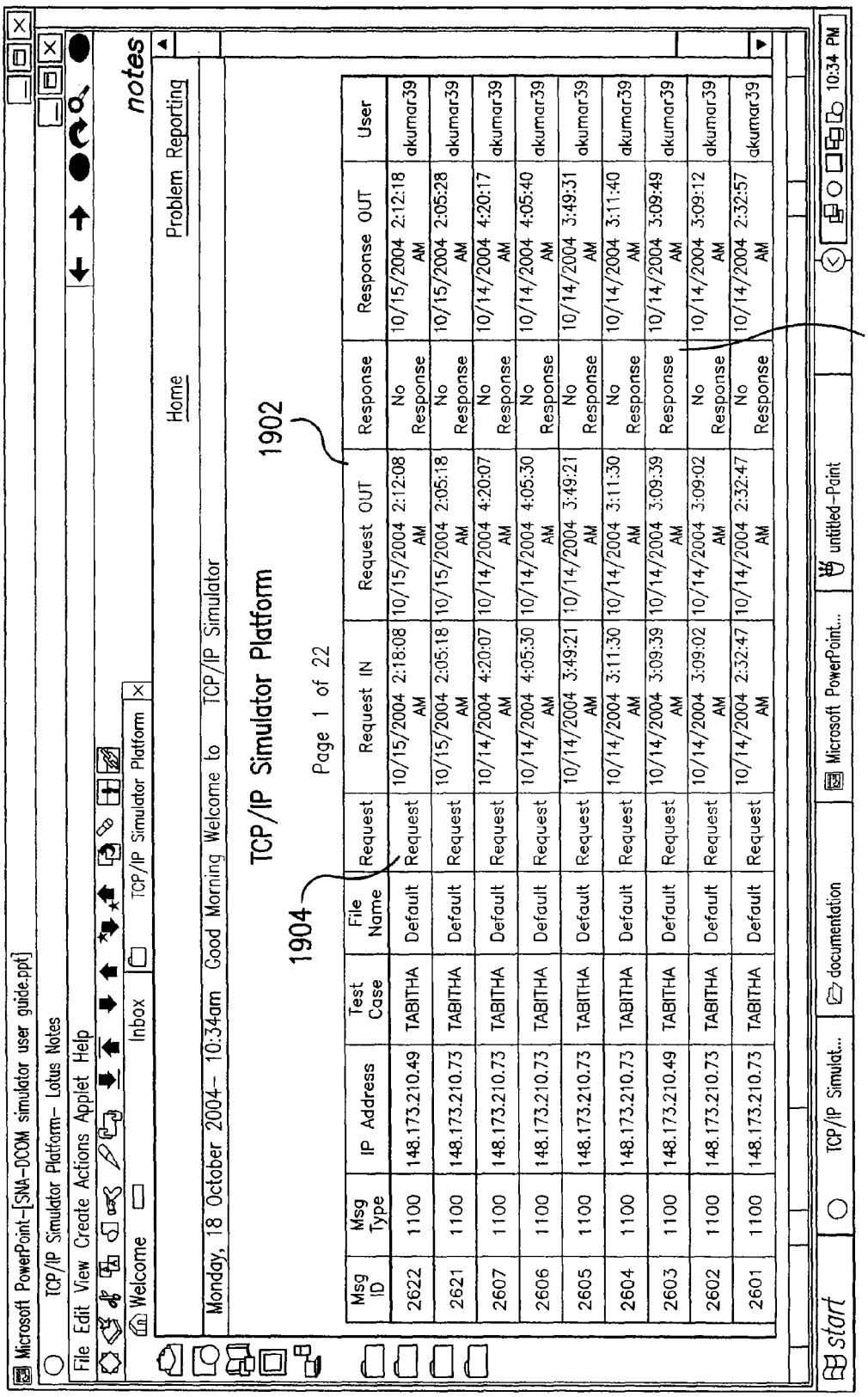
FIG. 19 illustrates an example filtered message table generated by the graphical user interface.

If "by person" radio button 1708 is selected, a person selection screen 1800 displays a person selection menu 1802, as shown in FIG. 18. A name of a person for whom messages will be filtered may be selected from person selection menu 1802. After the appropriate person has been selected, next button 1804 may be selected. This displays, as shown in FIG. 19, a filtered message table 1902. Filtered message table 1902 lists messages created and/or sent by the selected person. For each message, filtered message table 1902 may include, for example and without limitation, a message identifier, the message type, the sending and/or host IP address, the name of the related test case, one or more timestamps related to the request, the status of a response, one or more timestamps related to the response, and a user identifier. Filtered message table 1902 may also include hyperlinks to individual messages. To navigate through the messages, a navigation bar (not shown) may be provided.

Figure 20:
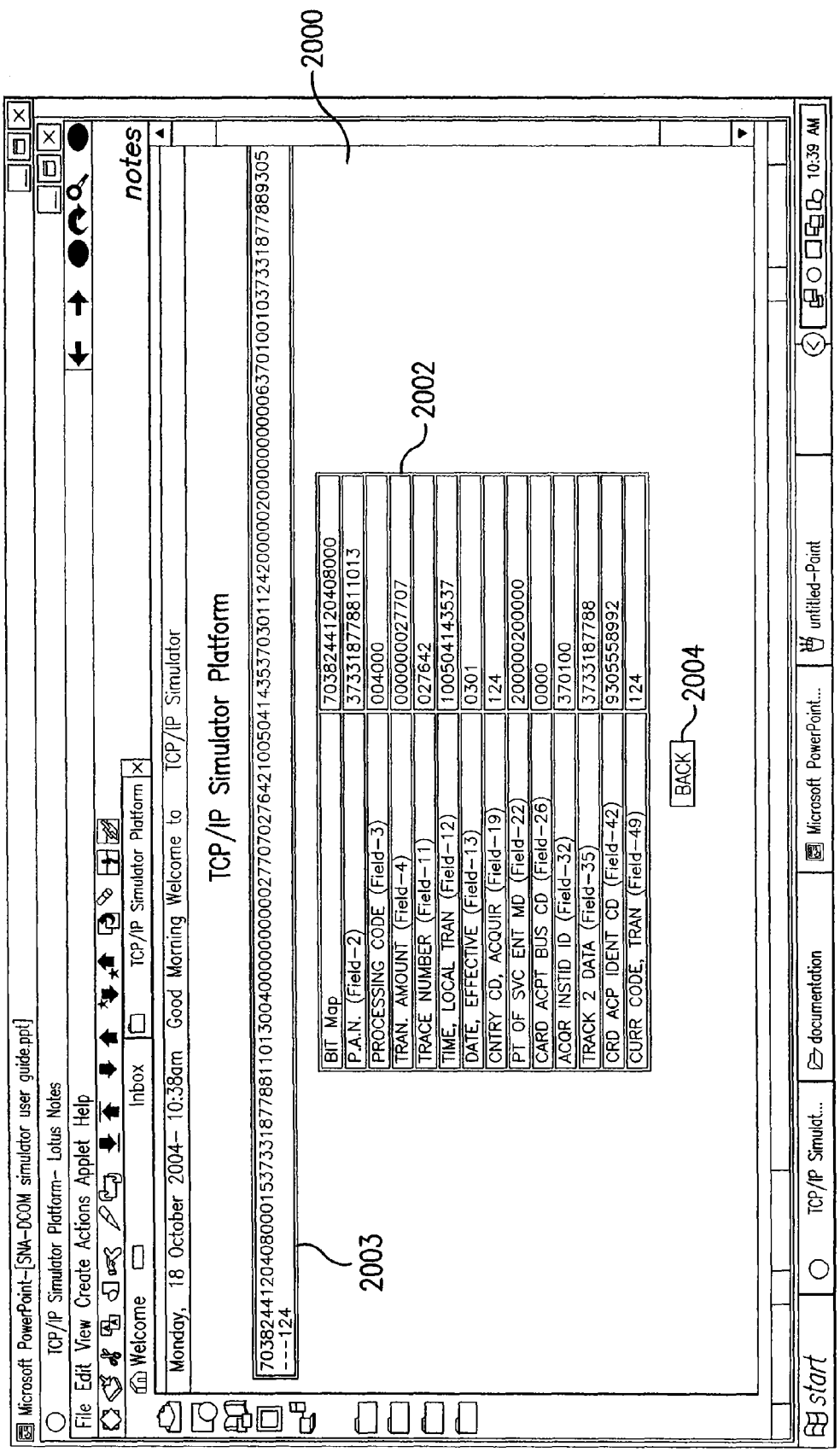
FIG. 20 illustrates an example requested message screen generated by the graphical user interface.

To view details of a particular message in filtered message table 1902, a request link for the particular message, such as request link 1904, may be selected. This displays a requested message screen 2000, as shown in FIG. 20. Requested message screen 2000 displays a table 2002 listing detailed information about the particular message. A data stream field 2003 may also be displayed to show the actual data stream for the message. To return to the previous window, back button 2004 may be selected.

Figure 21:
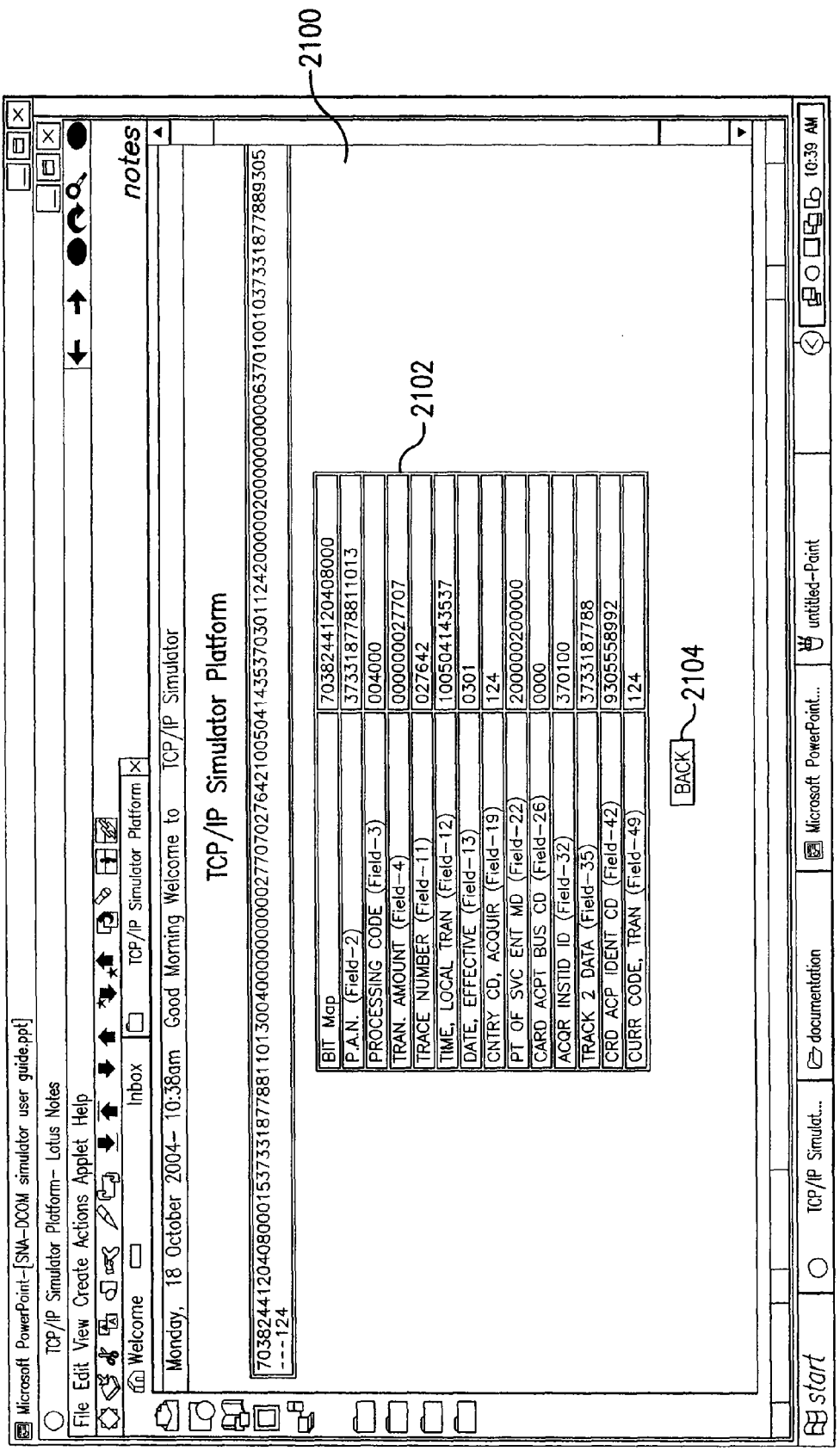
FIG. 21 illustrates an example response screen generated by the graphical user interface.

To view details about a TPF response to a particular message, a response link, such as response link 1906 in FIG. 19, may be selected. This displays a response screen 2100, as shown in FIG. 21. Response screen 2100 displays a table 2102 listing detailed information about the response. To return to the previous window, back button 2104 may be selected.

Figure 22:
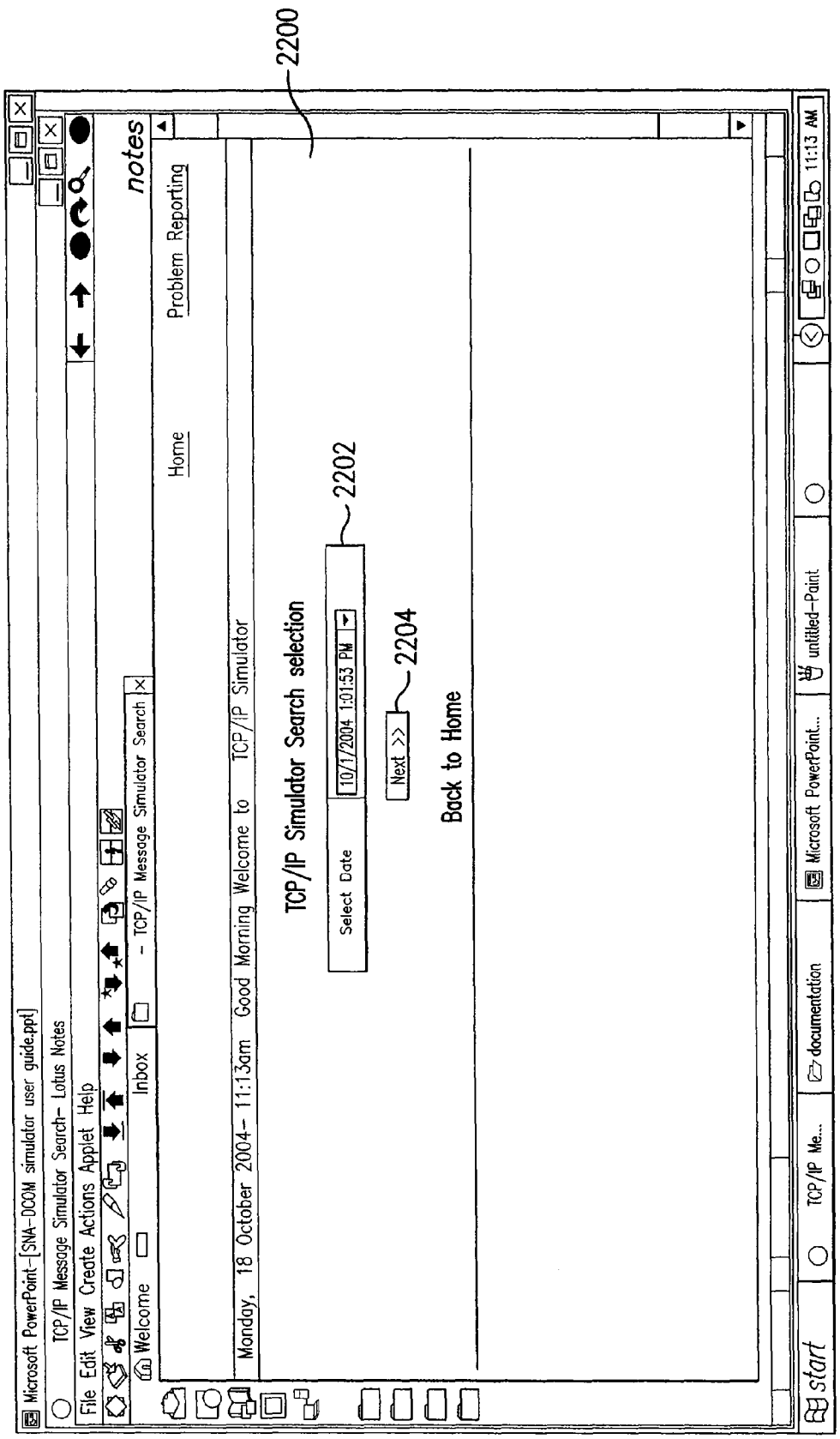
FIG. 22 illustrates an example date selection screen generated by the graphical user interface.

If "by date" radio button 1710 is selected in search criteria menu 1702, a date selection screen 2200 displays a date selection menu 2202, as shown in FIG. 22. A date may be selected from or entered into date selection menu 2202. After the appropriate date has been determined, next button 2204 may be selected. This displays a filtered message table listing messages sent on the selected date. The filtered message table is similar to message table 1902 in FIG. 19. Messages and responses in the filtered message table may be viewed in a similar manner to that described with respect to FIGS. 20 and 21.

Figure 23:
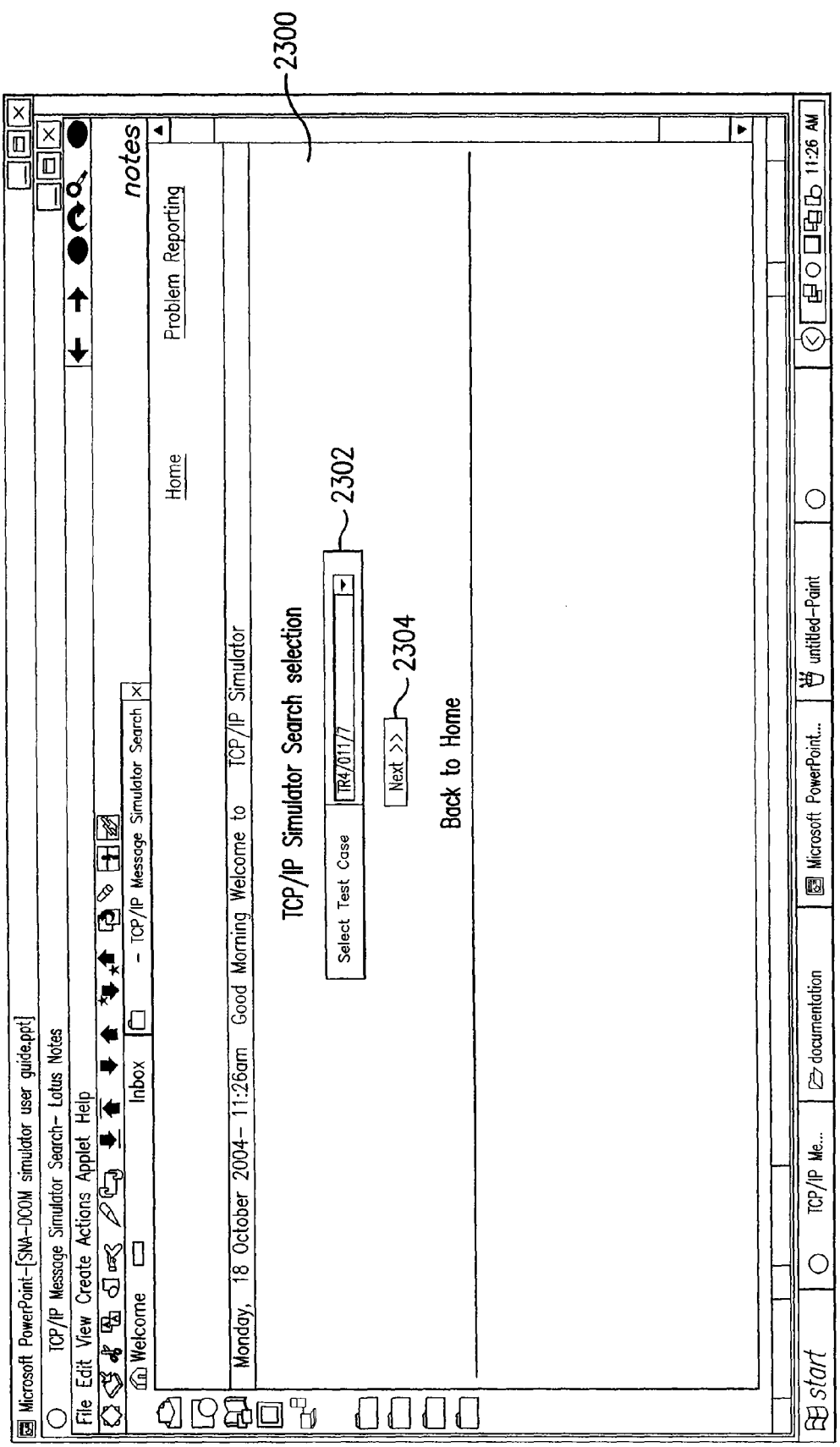
FIG. 23 illustrates an example test case selection screen generated by the graphical user interface.

If "by test case" radio button 1712 is selected in search criteria menu 1702, a test case selection screen 2300 displays a test case selection menu 2302, as shown in FIG. 23. A test case may be a particular project in progress, such as, for example and without limitation, a test of hardware or server configuration or a test of message format. A test case may be selected from or entered into test case selection menu 2302. After the appropriate test case has been selected, next button 2304 may be selected. This displays a filtered message table listing messages related to the selected test case. The filtered message table is similar to message table 1902 in FIG. 19. Messages and responses in the filtered message table may be viewed in a similar manner to that described with respect to FIGS. 20 and 21.

Figure 24:
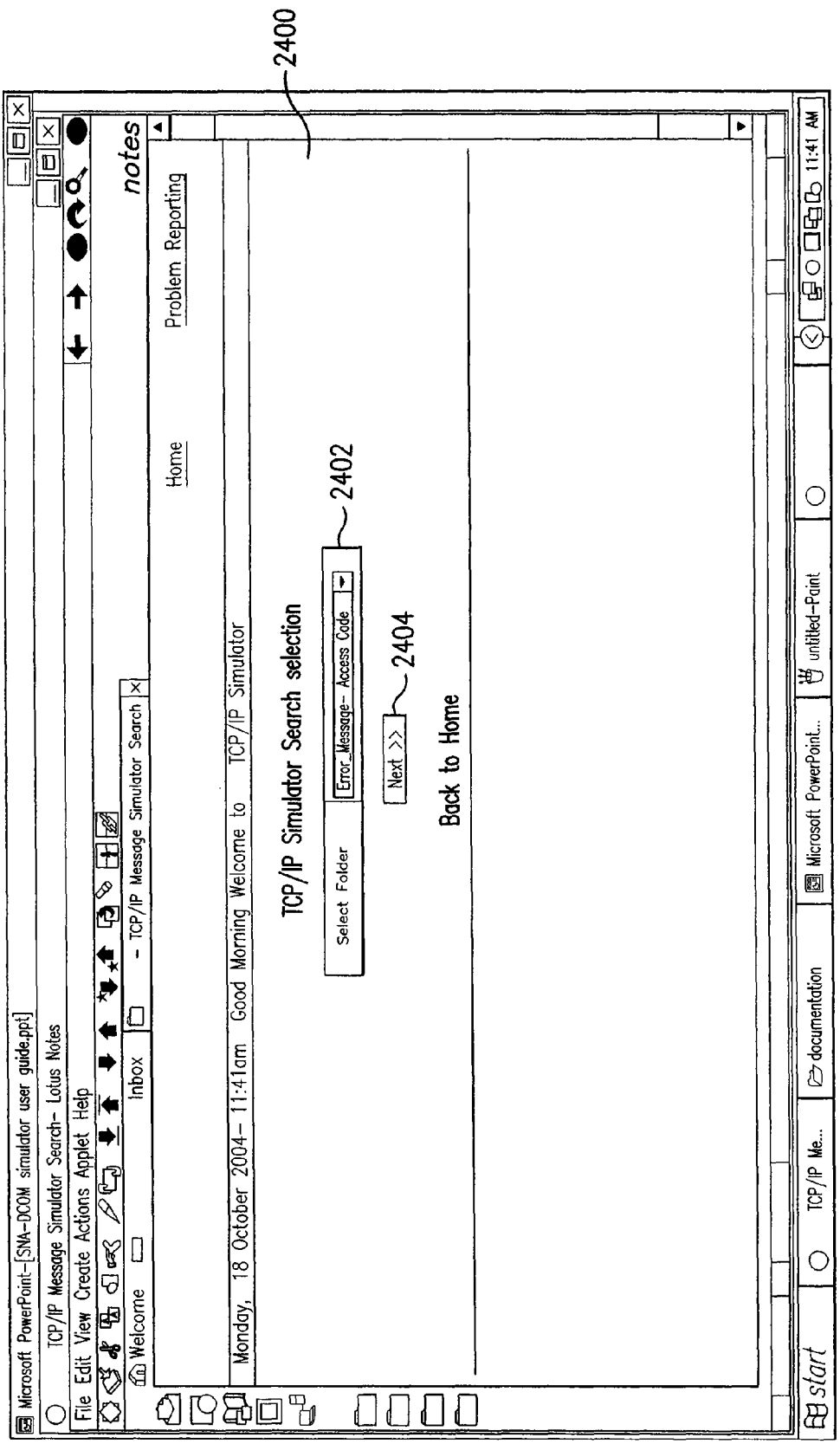
FIG. 24 illustrates an example folder selection screen generated by the graphical user interface.

If "by folder" radio button 1714 is selected in search criteria menu 1702, a folder selection screen 2400 displays a folder selection menu 2402, as shown in FIG. 24. A specific folder may be selected from or entered into folder selection menu 2402. After the appropriate folder has been selected, next button 2404 may be selected. This displays a filtered message table listing messages included in the selected folder. The filtered message table is similar to message table 1902 in FIG. 19. Messages and responses in the filtered message table may be viewed in a similar manner to that described with respect to FIGS. 20 and 21.

Figure 25:
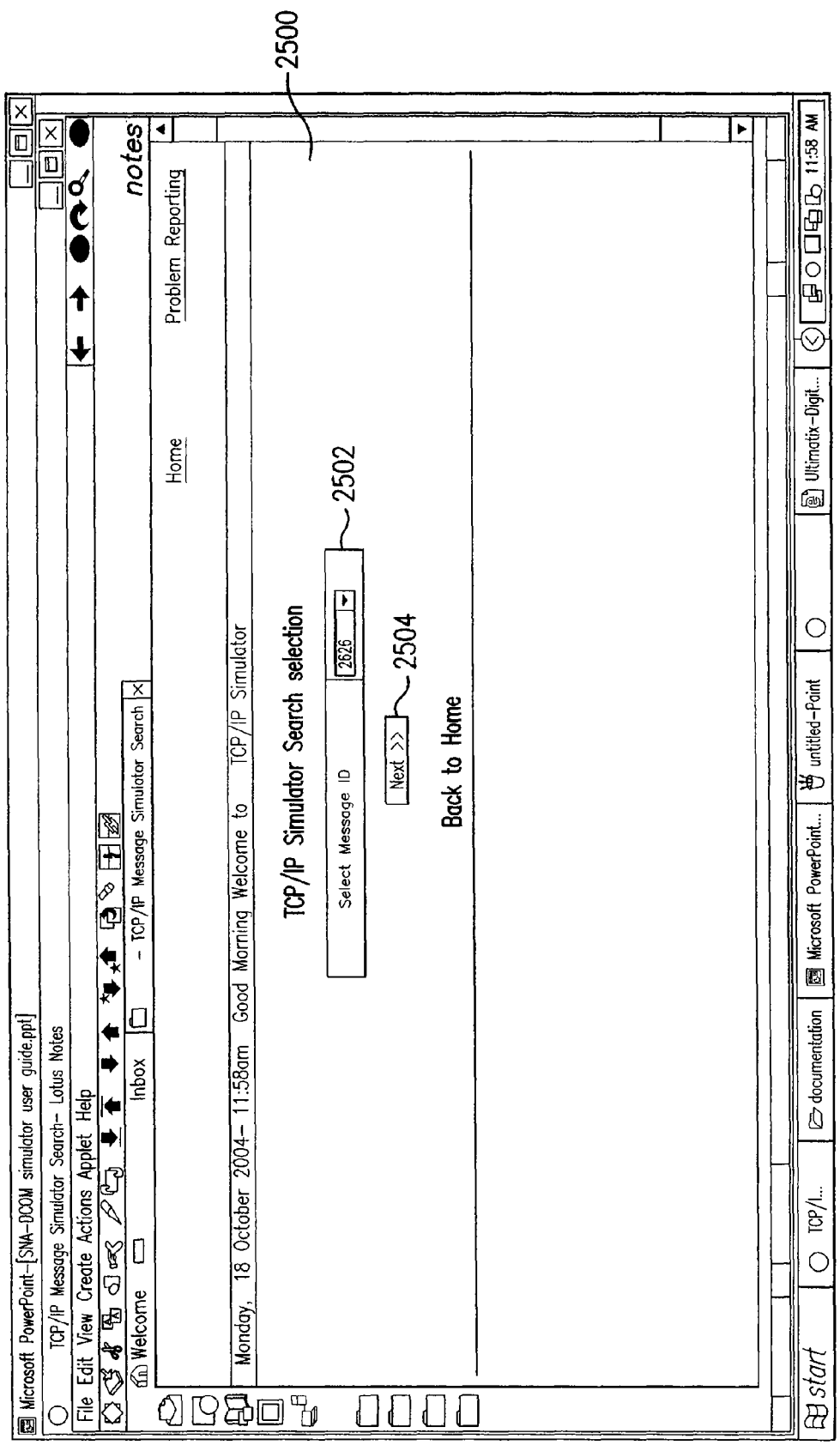
FIG. 25 illustrates an example message identification selection screen generated by the graphical user interface.

If "by msgID" radio button 1716 is selected in search criteria menu 1702, a message identification selection screen 2500 displays a message identifier selection menu 2502, as shown in FIG. 25. A message identifier may be selected from or entered into message identifier selection menu 2502. After the appropriate message identifier has been selected, next button 2504 may be selected. This displays a filtered message table listing one or more messages having the selected message identifier. The filtered message table is similar to message table 1902 in FIG. 19. Messages and responses in the filtered message table may be viewed in a similar manner to that described with respect to FIGS. 20 and 21.

Figure 26:
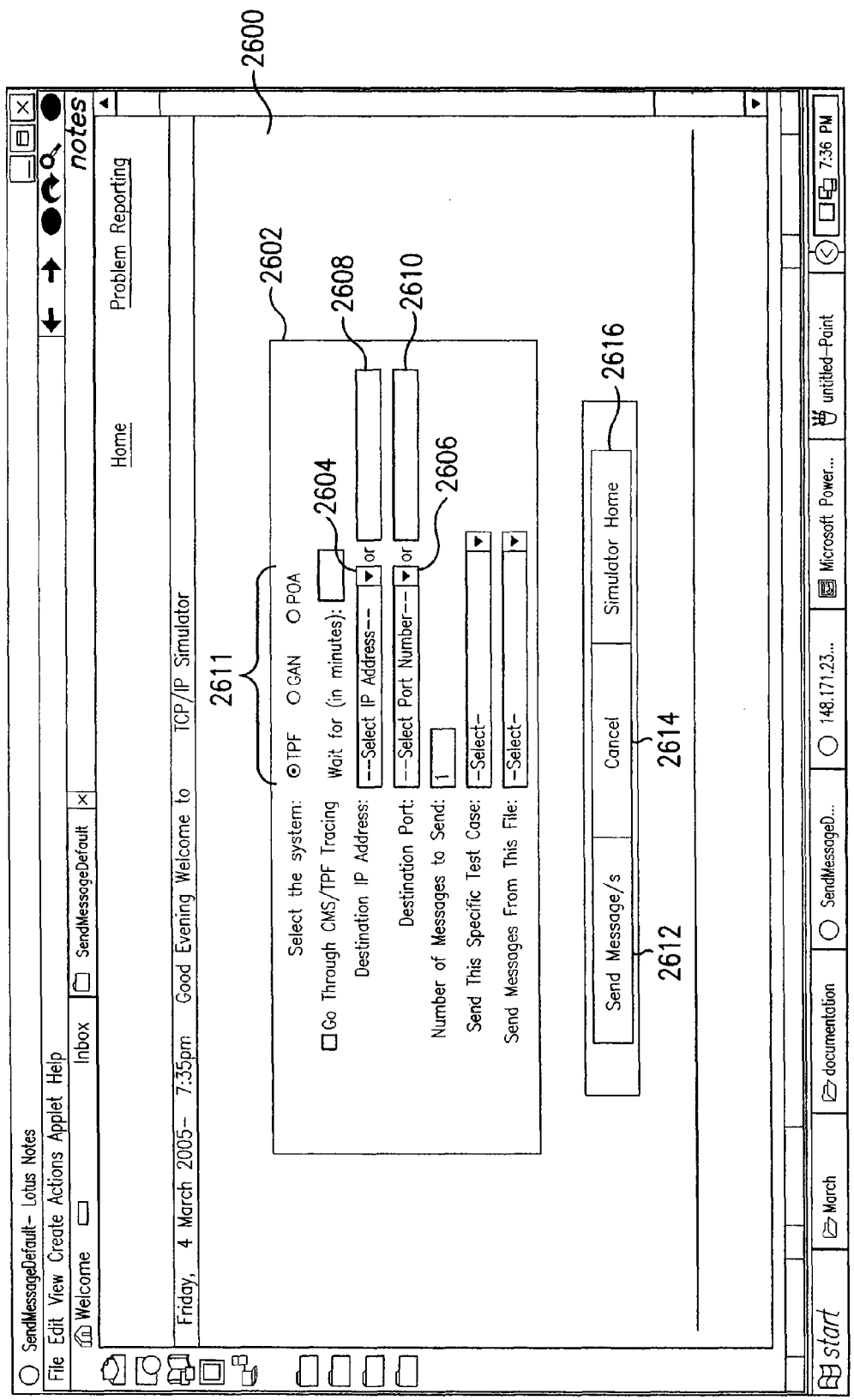
FIG. 26 illustrates an example message information screen generated by the graphical user interface.

On homepage 500, send messages from repository link 514 may be selected to send messages in volume from a particular folder. This displays a message information screen 2600, as shown in FIG. 26. Message information screen 2600 displays a data entry box 2602. Data entry box 2602 allows a user to enter testing information. For example, the destination IP address and the destination port can be selected from destination IP address menu 2604 and destination port menu 2606, respectively. If the desired IP address is already known or is not found in destination IP address menu 2604, the IP address may be entered in destination IP address text box 2608. Similarly, if the desired port is already known or is not found in destination port menu 2606, the port may be entered in destination port text box 2610. The type of system to which the message is being sent (e.g., TPF, GAN, POA) may also be selected using radio buttons 2611. To send multiple messages, the number of messages to send, the specific test case to send, or a file containing specific messages may be input in data entry box 2602. One of skill in the relevant art(s) will recognize that other information relevant to sending multiple messages may also be input without departing from the spirit and scope of the present invention.

Once the information requested in data entry box 2602 is complete, the message may be sent by selecting send message button 2612. If no message is to be sent, cancel button 2614 may be selected. To return to homepage 500, simulator home button 2616 may be selected.

Figure 27:
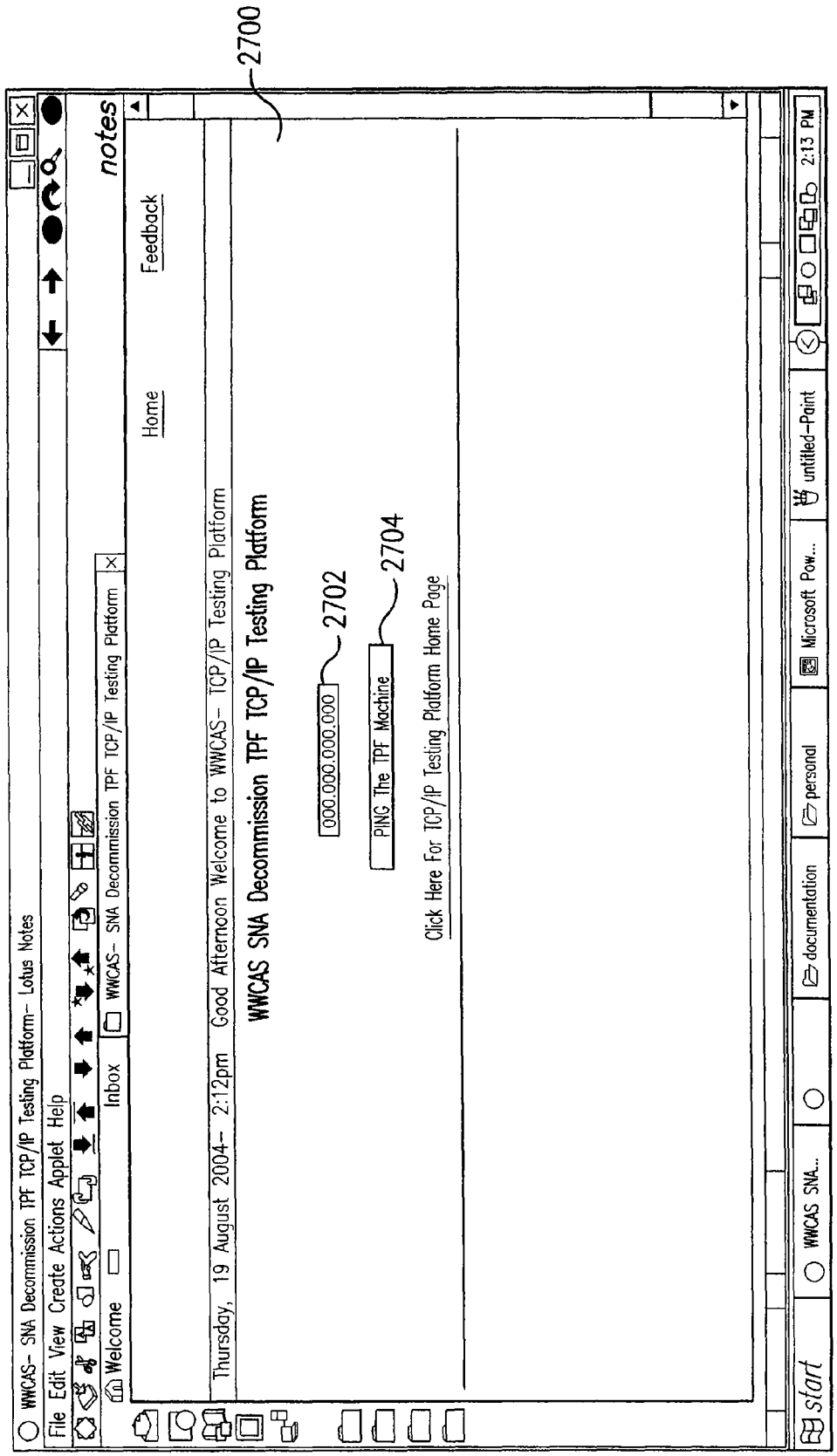
FIG. 27 illustrates an example TCP/IP test screen generated by the graphical user interface.

On homepage 500, a TCP/IP connection to a TPF system may be tested by selecting TPF system ping link 516. This displays a TCP/IP test screen 2700 having a TPF IP address text box 2702, as shown in FIG. 27. Once the IP address of the TPF in question is entered in text box 2702, a TPF machine ping button 2704 may be selected to proceed with the test.

Figure 28:
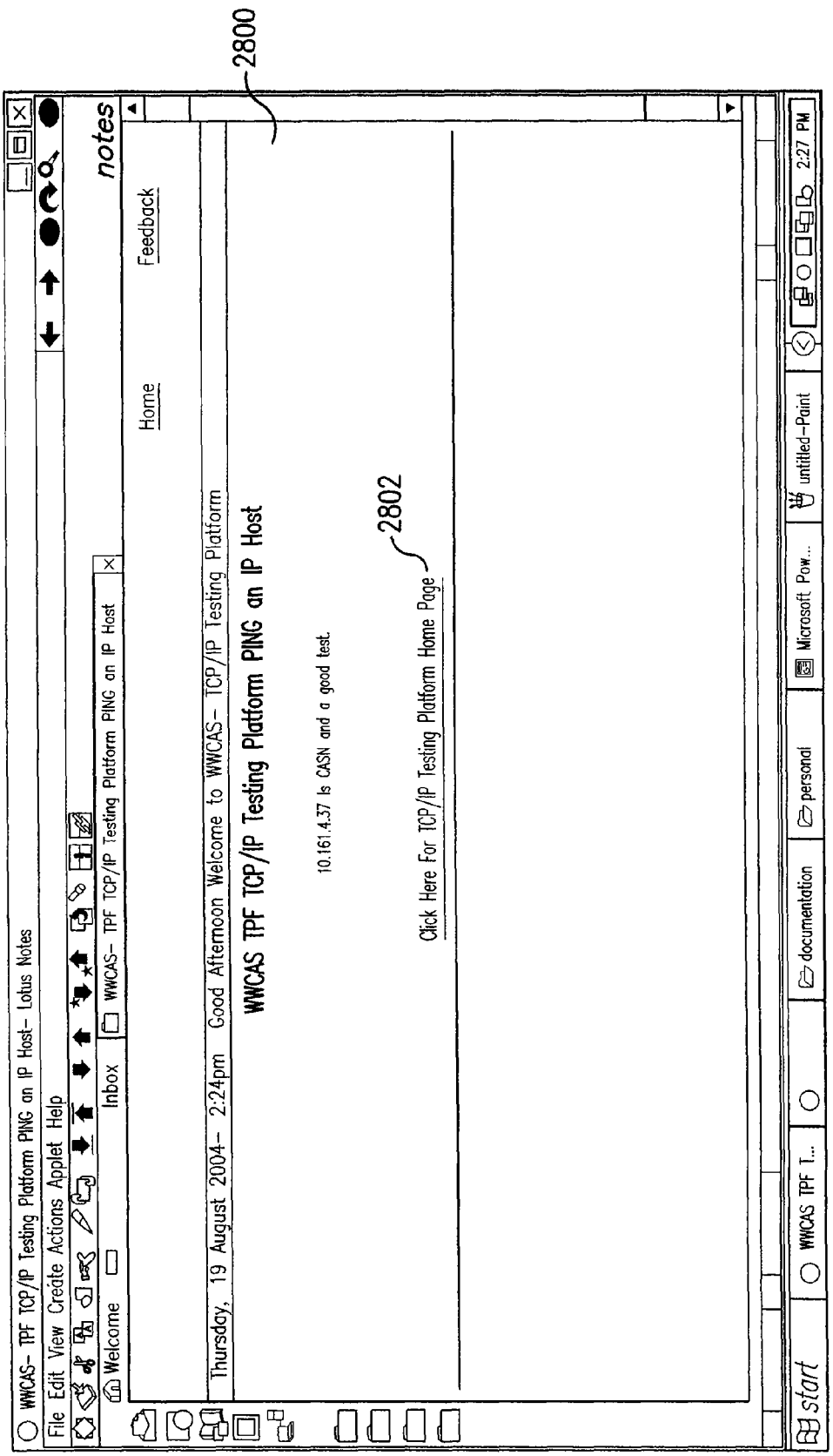
FIG. 28 illustrates an example ping results screen generated by the graphical user interface.

The result of the test may be displayed in ping results screen 2800, as shown in FIG. 28. Ping results screen 2800 may indicate, for example and without limitation, the type of system located at the entered IP address and/or the status of the ping test. To return to TCP/IP test screen 2700, a TCP/IP testing platform home page link 2802 may be selected.

Figure 29:
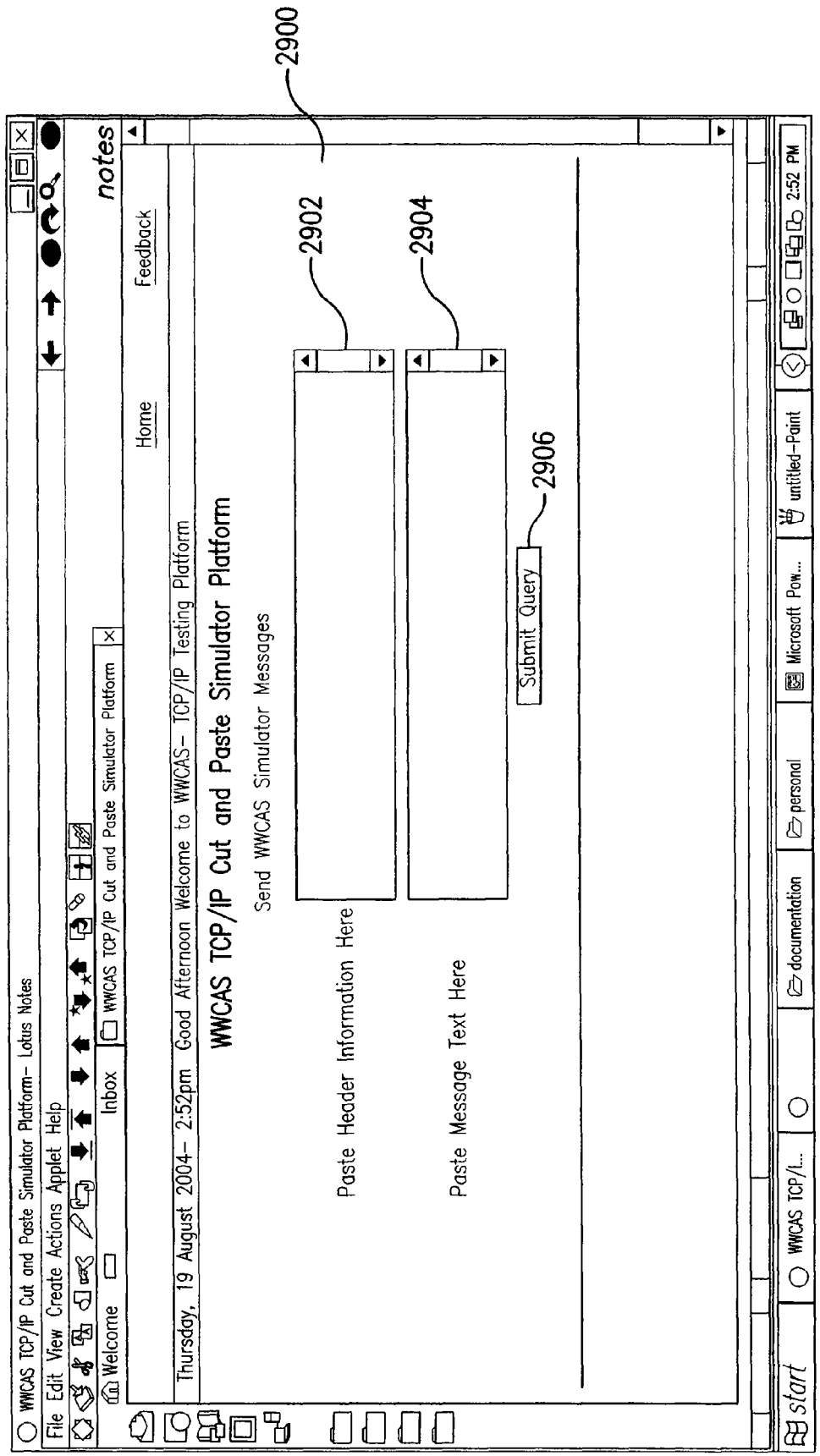
FIG. 29 illustrates an example cut-and-paste screen generated by the graphical user interface.

On homepage 500, message cut-and-paste link 518 may be selected to cut and paste information from a previous message into a new message. This displays a cut-and-paste screen 2900, as shown in FIG. 29. Header information from the previous message may be pasted into header information data entry box 2902. Message text from the previous message may be pasted into message text data entry box 2904. Edits may also be made in each of header information data entry box 2902 and message text data entry box 2904. Once all of the information has been entered, submit query button 2906 may be selected to send the message to the TPF.

On homepage 500, documentation menu 506 includes, for example, simulator user guide link 520. Selecting simulator user guide link 520 may open, for example, an electronic and/or a printable copy of a user guide for the simulator.

Figure 30:
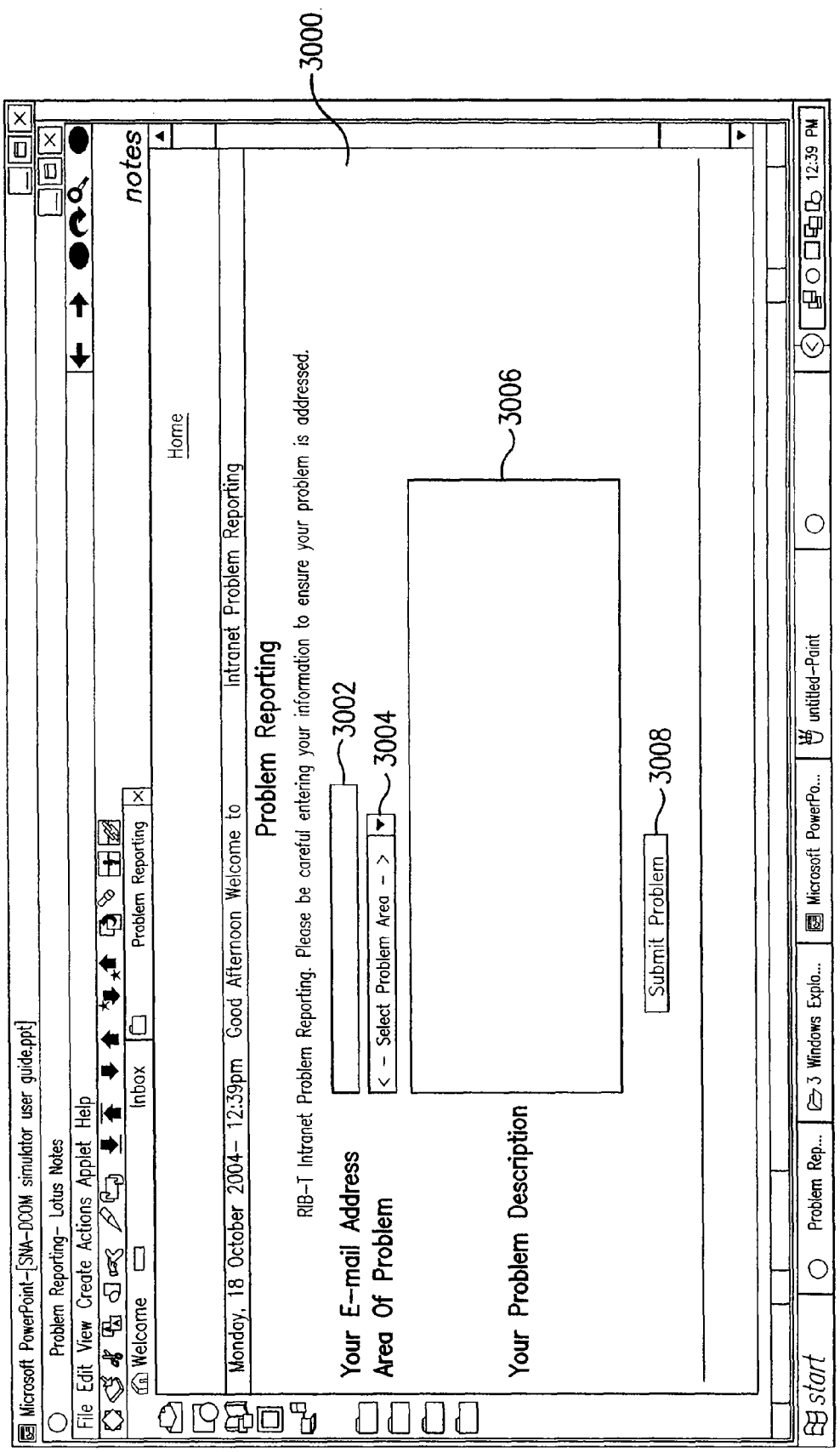
FIG. 30 illustrates an example problem reporting screen generated by the graphical user interface.

Homepage 500 also includes a problem reporting link 522. Selecting problem reporting link 522 displays a problem reporting screen 3000, as shown in FIG. 30. Problem reporting screen 3000 includes an email address text box 3002, a problem area menu 3004, and a problem description text box 3006. The email address of the user encountering a problem may be entered in email address text box 3002. The type of problem encountered may be selected from or entered into problem area menu 3004. Problem area menu 3004 may include predetermined categories, or may be similar to a subject line of a typical email. Details related to the encountered problem may be entered into problem description text box 3006. Once the details have been entered, a submit problem button 3008 may be selected. The information is then routed to support staff for analysis and response.

The present invention (or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 31:
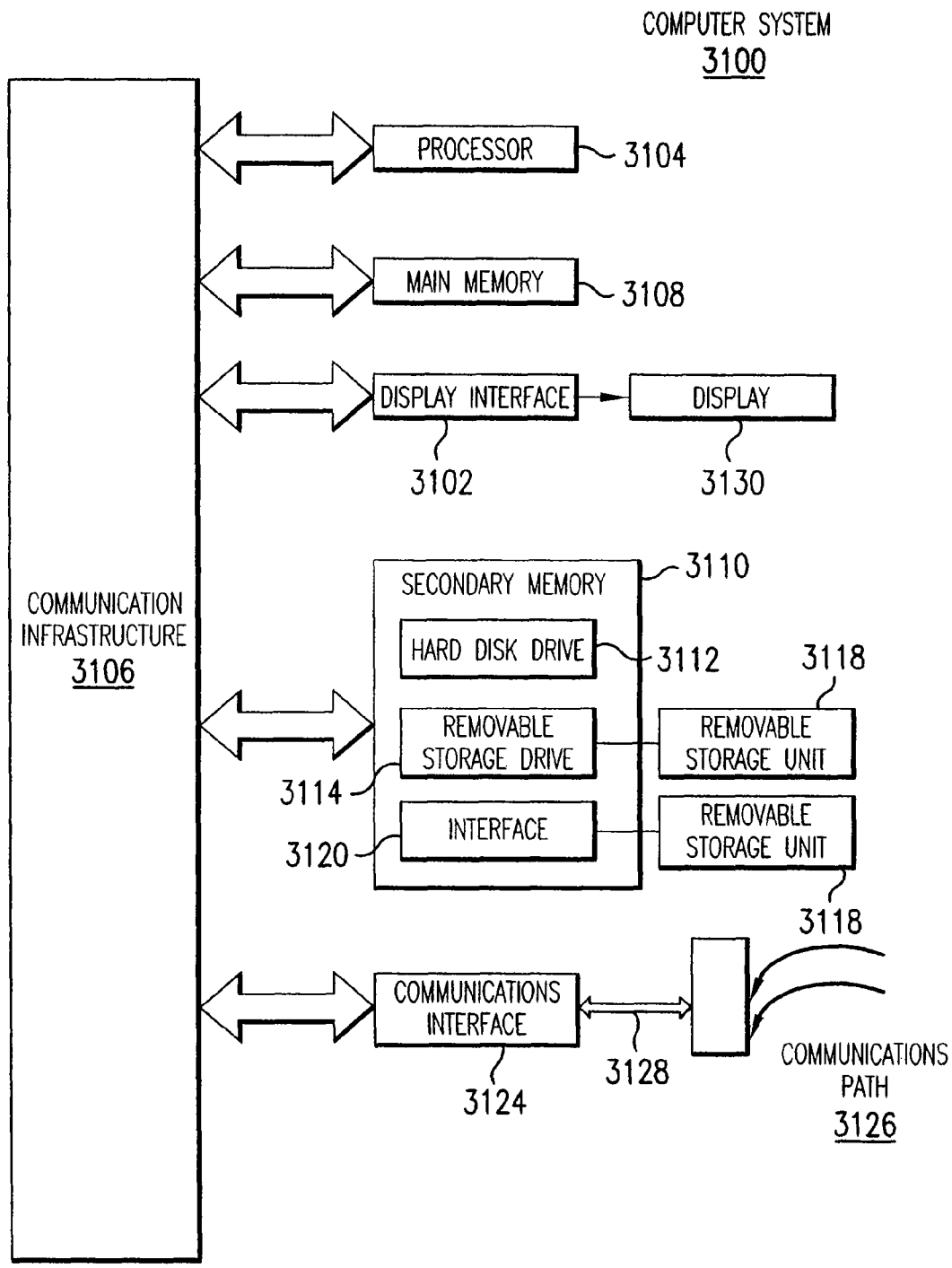
FIG. 31 is an exemplary computer system useful for implementing the present invention.

In fact, in one embodiment, the invention is directed toward one or more computer systems capable of carrying out the functionality described herein. An example of a computer system 3100 is shown in FIG. 31.

The computer system 3100 includes one or more processors, such as processor 3104. The processor 3104 is connected to a communication infrastructure 3106 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 3100 can include a display interface 3102 (such as, for example, user interface 102) that forwards graphics, text, and other data from the communication infrastructure 3106 (or from a frame buffer not shown) for display on the display unit 3130.

Computer system 3100 also includes a main memory 3108, preferably random access memory (RAM), and may also include a secondary memory 3110. The secondary memory 3110 may include, for example, a hard disk drive 3112 and/or a removable storage drive 3114, representing a floppy disk drive, a magnetic tape drive, an optical disk drive, etc. The removable storage drive 3114 reads from and/or writes to a removable storage unit 3118 in a well known manner. Removable storage unit 3118 represents a floppy disk, magnetic tape, optical disk, etc. which is read by and written to by removable storage drive 3114. As will be appreciated, the removable storage unit 3118 includes a computer usable storage medium having stored therein computer software and/or data.

In alternative embodiments, secondary memory 3110 may include other similar devices for allowing computer programs or other instructions to be loaded into computer system 3100. Such devices may include, for example, a removable storage unit 3118 and an interface 3120. Examples of such may include a program cartridge and cartridge interface (such as that found in video game devices), a removable memory chip (such as an erasable programmable read only memory (EPROM), or programmable read only memory (PROM)) and associated socket, and other removable storage units 3118 and interfaces 3120, which allow software and data to be transferred from the removable storage unit 3118 to computer system 3100.

Computer system 3100 may also include a communications interface 3124. Communications interface 3124 allows software and data to be transferred between computer system 3100 and external devices. Examples of communications Interface 3124 may include a modem, a network interface (such as an Ethernet card), a communications port, a Personal Computer Memory Card International Association (PCMCIA) slot and card, etc. Software and data transferred via communications interface 3124 are in the form of signals 3128 which may be electronic, electromagnetic, optical or other signals capable of being received by communications interface 3124. These signals 3128 are provided to communications interface 3124 via a communications path (e.g., channel) 3126. This channel 3126 carries signals 3128 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 3114, a hard disk installed in hard disk drive 3112, and signals 3128. These computer program products provide software to computer system 3100. The invention is directed to such computer program products.

Computer programs (also referred to as computer control logic) are stored in main memory 3108 and/or secondary memory 3110. Computer programs may also be received via communications interface 3124. Such computer programs, when executed, enable the computer system 3100 to perform the features of the present invention, as discussed herein. In particular, the computer programs, when executed, enable the processor 3104 to perform the features of the present invention. Accordingly, such computer programs represent controllers of the computer system 3100.

In an embodiment where the invention is implemented using software, the software may be stored in a computer program product and loaded into computer system 3100 using removable storage drive 3114, hard drive 3112 or communications interface 3124. The control logic (software), when executed by the processor 3104, causes the processor 3104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A simulator to test the transaction processing facility response to each message type, comprising:
    an ANSI queryable database configured to store message shells, sent messages, responses, and a test message table in a server, wherein the message shells comprise information corresponding to a message type, wherein the message type is selectable, wherein each message type includes a variety of fields, wherein a selection of the message type is based on the purpose of the message, and wherein the test message table comprises a hyperlink to a detailed view of a test message, a link for updating the test message and a link for deleting the test message, wherein the received responses are audited;
    a test message creation interface to the database; and
    a communications link between the server and a transaction processing facility, wherein a test message is created via the test message creation interface from the message shells, and wherein the test message is transmitted via the communications link to the transaction processing facility, wherein attributes of responses filtered by message type test the transaction processing facility.

2. The simulator of claim 1, wherein the created message is an ISO 8583 message.

3. The simulator of claim 1, wherein the database is accessible from a variety of user interfaces.

4. The simulator of claim 1, wherein the communications link is coupled directly to the transaction processing facility.

5. The simulator of claim 1, wherein the communications link passes through a global area network.

6. The simulator of claim 1, wherein the batch of test messages and the plurality of responses are accessible by users from multiple locations without requiring a seat license for each user.

7. A method, comprising:
    creating, by a processing device configured to create a test message, the test message from a message shell in a server-based ANSI queryable database using a server-based simulator, wherein the message shell comprises information corresponding to a message type, wherein each message type includes a variety of fields, wherein the message type is selectable, and wherein a selection of the message type is based on the purpose of the message;
    storing, by the processing device, a record of the test message in a test message table, wherein the test message table comprises a hyperlink to a detailed view of the test message, a link for updating the test message and a link for deleting the test message;
    sending, by the processing device, the test message to a transaction processing facility using the simulator to test the transaction processing facility response to each message type;
    storing, by the processing device, a response from the transaction processing facility in the server-based database; and
    auditing, by the processing device, the stored response, wherein attributes of responses are filtered by message type.

8. The method of claim 7, wherein the test message is an ISO 8583 message.

9. The method of claim 7, further comprising viewing the response through the simulator.

10. The method of claim 7, wherein the batch of test messages and the plurality of responses are accessible by users from multiple locations without requiring a seat license for each user.

11. The method of claim 7, further comprising:
determining, using the processing device, whether a response to the test message has been received within a specified timeframe;
if the response to the test message has been received within the specified timeframe, storing, using the processing device, the response; and
displaying the response.

12. The method of claim 7, wherein the message type is point-of-sale messages or ATM transaction messages.

13. The method of claim 7, further comprising using the test message created from the message shell to test connectivity of a server associated with the server-based database to the transaction processing facility.

14. A method, comprising:
creating, by a processing device configured to create a test message, a batch of test messages from message shells in a server-based ANSI queryable database using a server-based simulator, wherein the message shells comprise information corresponding to a message type, wherein each message type includes a variety of fields, wherein the message type is selectable, and wherein a selection of the message type is based on the purpose of the message;
storing, by the processing device, a record of the created batch of test messages in a test message table, wherein the test message table comprises a hyperlink to a detailed view of a test message, a link for updating the test message and a link for deleting the test message;
sending, by the processing device, the batch of test messages through the simulator to a transaction processing facility to test the transaction processing facility response to each message type;
storing, by the processing device, a plurality of responses to the batch of test messages from the transaction processing facility; and
auditing, by the processing device, each response in the stored batch of test message responses, wherein attributes of the stored batch of test message responses is filtered by message type.

15. The method of claim 14, wherein the storing step comprises storing the plurality of responses in the server-based database.

16. The method of claim 14, wherein the storing step comprises outputting the plurality of responses to a text file.

17. The method of claim 14, wherein the test messages are ISO 8583 messages.

18. The method of claim 14, further comprising viewing the responses through the simulator.

19. A non-transitory computer readable storage medium having instructions stored thereon that, if executed by a computing device configured to create a test message, cause the computing device to perform operations comprising:
creating, by the computing device, the test message from a message shell in a server-based ANSI queryable database through a server-based simulator, wherein the message shell comprises information corresponding to a message type, wherein each message type includes a variety of fields, wherein the message type is selectable, and wherein a selection of the message type is based on the purpose of the message;
storing, by the computing device, a record of the test message in a test message table, wherein the test message table comprises a hyperlink to a detailed view of the test message, a link for updating the test message and a link for deleting the test message;
sending, by the computing device, the test message to the transaction processing facility through the simulator to test the transaction processing facility response to each message type;
storing, by the computing device, a response from the transaction processing facility; and
auditing, by the computing device, each response from the transaction processing facility, wherein attributes of the stored response messages is filtered by message type.

20. The medium of claim 19, wherein the test message is an ISO 8583 message.

21. The medium of claim 19, further comprising:
displaying the response through the simulator.

22. The medium of claim 19, wherein the storing step comprises storing the response in the server-based database.

23. The medium of claim 19, wherein the storing step comprises outputting the response to a text file simulator.

* * * * *